US012511606B2

(12) United States Patent
Bonafe et al.

(10) Patent No.: US 12,511,606 B2
(45) Date of Patent: Dec. 30, 2025

(54) WEARABLE READER DEVICE TECHNOLOGY FOR GUIDING A USER TO LOAD AN ASSET IN AN ASSIGNED LOGISTICS VEHICLE

(71) Applicant: UNITED PARCEL SERVICE OF AMERICA, INC., Atlanta, GA (US)

(72) Inventors: Jethro Bonafe, Atlanta, GA (US); Christopher Azar, Atlanta, GA (US); Dennis Bautista, Atlanta, GA (US); Vincent Pizzuto, Atlanta, GA (US); Derek Uber, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/089,884

(22) Filed: Dec. 28, 2022

(65) Prior Publication Data

US 2024/0220913 A1  Jul. 4, 2024

(51) Int. Cl.
*G06Q 10/0833* (2023.01)
*G06K 7/10* (2006.01)
*H04B 17/318* (2015.01)

(52) U.S. Cl.
CPC ..... *G06Q 10/0833* (2013.01); *G06K 7/10386* (2013.01); *G06K 7/10396* (2013.01); *H04B 17/318* (2015.01); *G06K 2007/10524* (2013.01)

(58) Field of Classification Search
CPC ........... G06Q 10/0833; G06K 710/386; G06K 710/10396

(Continued)

(56) References Cited

U.S. PATENT DOCUMENTS

2009/0050697 A1\*  2/2009  Sparks ............... G07C 9/257
                                                 235/382.5
2019/0026688 A1   1/2019  Liu et al.
(Continued)

FOREIGN PATENT DOCUMENTS

AU  2008304678 A1 \*  4/2010  ....... G06K 19/07749
CN      102592339 A  \*  7/2012
(Continued)

OTHER PUBLICATIONS

European search report received for European Application No. 23217039.9, mailed on Apr. 24, 2024, 9 pages.

*Primary Examiner* — Akiba K Robinson
(74) *Attorney, Agent, or Firm* — Shook, Hardy & Bacon L.L.P.

(57) ABSTRACT

In various embodiments, a first indication that a first reader device has read data of a first tag coupled to a first asset is received. The first reader device is included in an article worn by a user. Subsequent to the receiving of the first indication, a second indication that at least one of: a second reader device has read the data of the first tag, or the first reader device has read data of a second tag is received. The second reader device and the second tag are located in a first logistics vehicle. Based at least in part on the receiving of the first indication and the second indication, it is determined that the user has transported the first asset to the first logistics vehicle. In response to the determining, a notification indicating whether the first asset has been transported to a correctly assigned logistics vehicle is transmitted to the first reader device or a third device associated with the user.

20 Claims, 11 Drawing Sheets

(58) Field of Classification Search
USPC .......................................................... 705/333
See application file for complete search history.

(56) References Cited

U.S. PATENT DOCUMENTS

| | | | |
|---|---|---|---|
| 2020/0209865 A1* | 7/2020 | Jarvis | ...................... B66F 9/063 |
| 2021/0027122 A1 | 1/2021 | Volkerink et al. | |
| 2022/0126326 A1 | 4/2022 | Freeman et al. | |

FOREIGN PATENT DOCUMENTS

| | | | |
|---|---|---|---|
| JP | 3980116 B2 * | 9/2007 | |
| WO | 2011/038018 A1 | 3/2011 | |

* cited by examiner

| TAG ID | ASSET ID | ASSIGNED LOGISTIC VEHICLE |
|---|---|---|
| 1 | A | XJ5 |
| 2 | B | TZL |
| 3 | C | BFD |
| 4 | D | RQZ |

*FIG. 6.*

| READER DEVICE ID | LOGISTICS VEHICLE ID |
|---|---|
| 1 | TZL |
| 2 | BFD |
| 3 | ABC |

*FIG. 7.*

WEARABLE READER DEVICE TECHNOLOGY FOR GUIDING A USER TO LOAD AN ASSET IN AN ASSIGNED LOGISTICS VEHICLE

BACKGROUND

In the shipping industry, before an asset (e.g., a package, a container, or bag of small items) reaches a final delivery destination, it typically goes through various operations. For instance, after a package has been dropped off at a carrier store for a delivery request, it may be routed to a hub or sorting facility. The package may traverse various different conveyor belt assemblies and go through different sorting processes in the hub based on information associated with the package (e.g., size of package, destination address, weight, etc.). After traversal of the package through the hub, a user may load the package into a logistics vehicle (e.g., a package car) for delivery to the final delivery destination or delivery to the next sorting phase operation.

Existing technologies for guiding the user to load an asset in the correctly assigned logistics vehicle and detecting whether an asset is inside the logistics vehicle have limited functionality or features, are inaccurate, negatively impact the user experience, and unnecessarily consume computing resources, among other technical problems. For example, carrier package scanning devices include components (e.g., a trigger mechanism) that require tedious manual user input, which causes likelihood of inaccuracies, among other technical problems. In another example, location-sensing technologies, such as Global Positioning System (GPS) technologies, are incapable of, or have difficulty with, detecting assets inside a logistics vehicle, among other technical problems.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to a system that includes at least one computer processor, and one or more computer storage media storing computer-useable instructions that, when used by the at least one computer processor, cause the at least one computer processor to perform the following operations. A first indication that a first reader device (e.g., an RFID reader) has read data of a first tag (e.g., an RFID tag) coupled to a first asset is received. The first reader device is included in an article worn by a user. In response to the receiving of the first indication, a data structure that indicates that the first asset is assigned to be placed in a first logistics vehicle, of a plurality of logistics vehicles, is accessed. A second indication that a second reader device has read the data of the first tag is received. Based at least in part on the accessing of the data structure and the receiving of the second indication, it is determined whether the first asset is inside of the first logistics vehicle.

Some embodiments are directed to a computer-implemented method comprising the following operations. A first indication that a first reader device has read data of a first tag coupled to a first asset is received. The first reader device is included in an article worn by a user. Subsequent to the receiving of the first indication, a second indication that at least one of: a second reader device has read the data of the first tag, or the first reader device has read data of a second tag is received. The second reader device and the second tag are located in a first logistics vehicle. Based at least in part on the receiving of the first indication and the second indication, it is determined that the user has transported the first asset to the first logistics vehicle. In response to the determining, a notification indicating whether the first asset has been transported to a correctly assigned logistics vehicle is transmitted to the first reader device or a third device associated with the user.

Some embodiments are directed to a system that includes a first reader device coupled to a wearable article. The first reader device is configured to read data of one or more tags coupled to one or more assets. The wearable article is configured to be worn by a user. In some embodiments, the system further includes at least one of: a second reader device or a second tag coupled to an inside housing of a first logistic vehicle. The second reader device being at least partially configured to read the one or more tags. In some embodiments, the system further includes at least one computer processor and one or more computer storage media storing computer-useable instructions that, when used by the at least one computer processor, cause the at least one computer processor to perform the following operations. Determining whether a first asset is inside a correctly assigned logistics vehicle based at least in part on the second reader device reading data of the one or more tags or the first reader device reading data of the second tag. In response to the determining, transmitting, to the first reader device or a third device associated with the user, a notification indicating whether the first asset is inside the correctly assigned logistics vehicle.

BRIEF DESCRIPTION OF THE DRAWINGS

Figure 1:
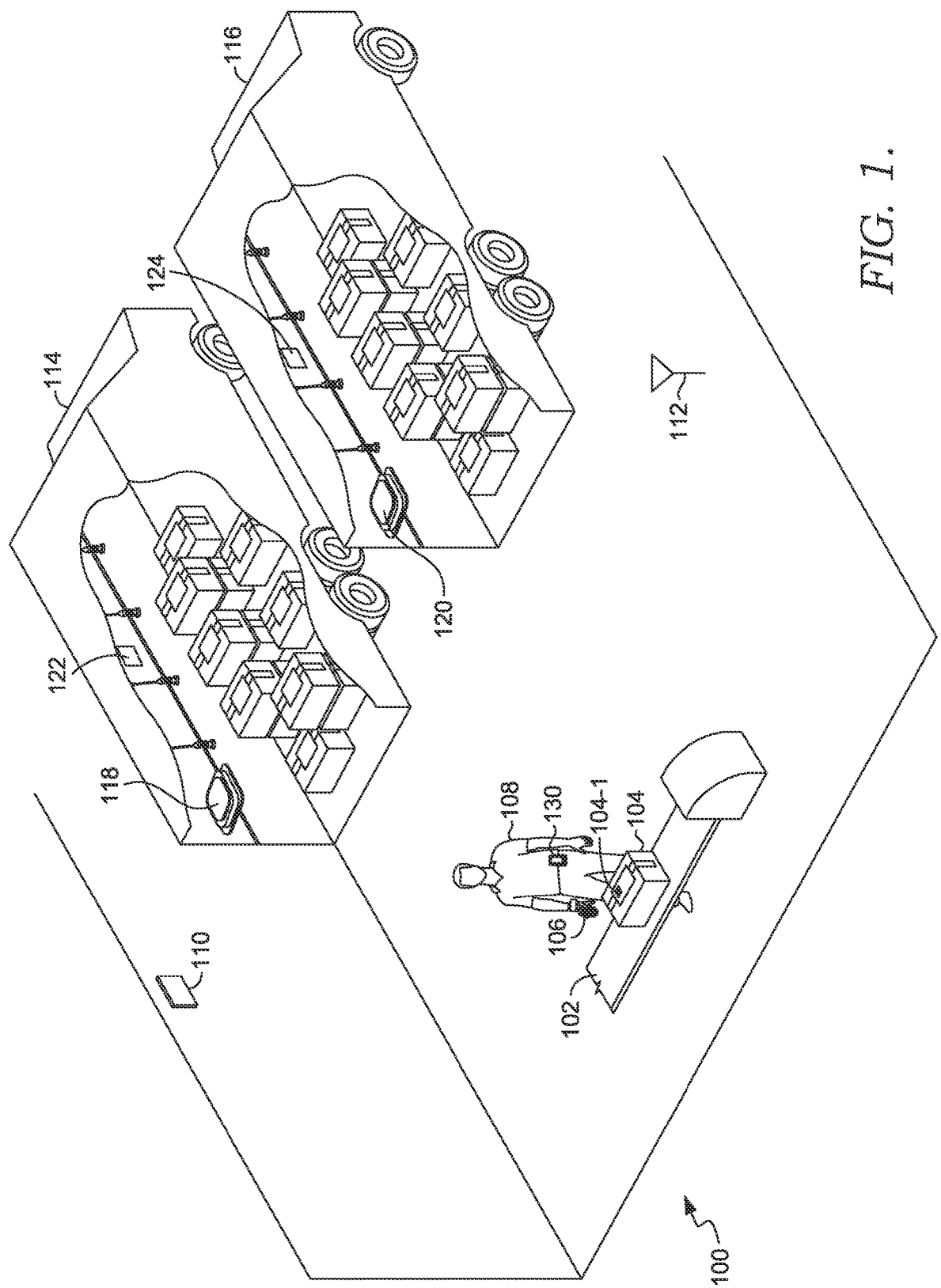
Figure 2:
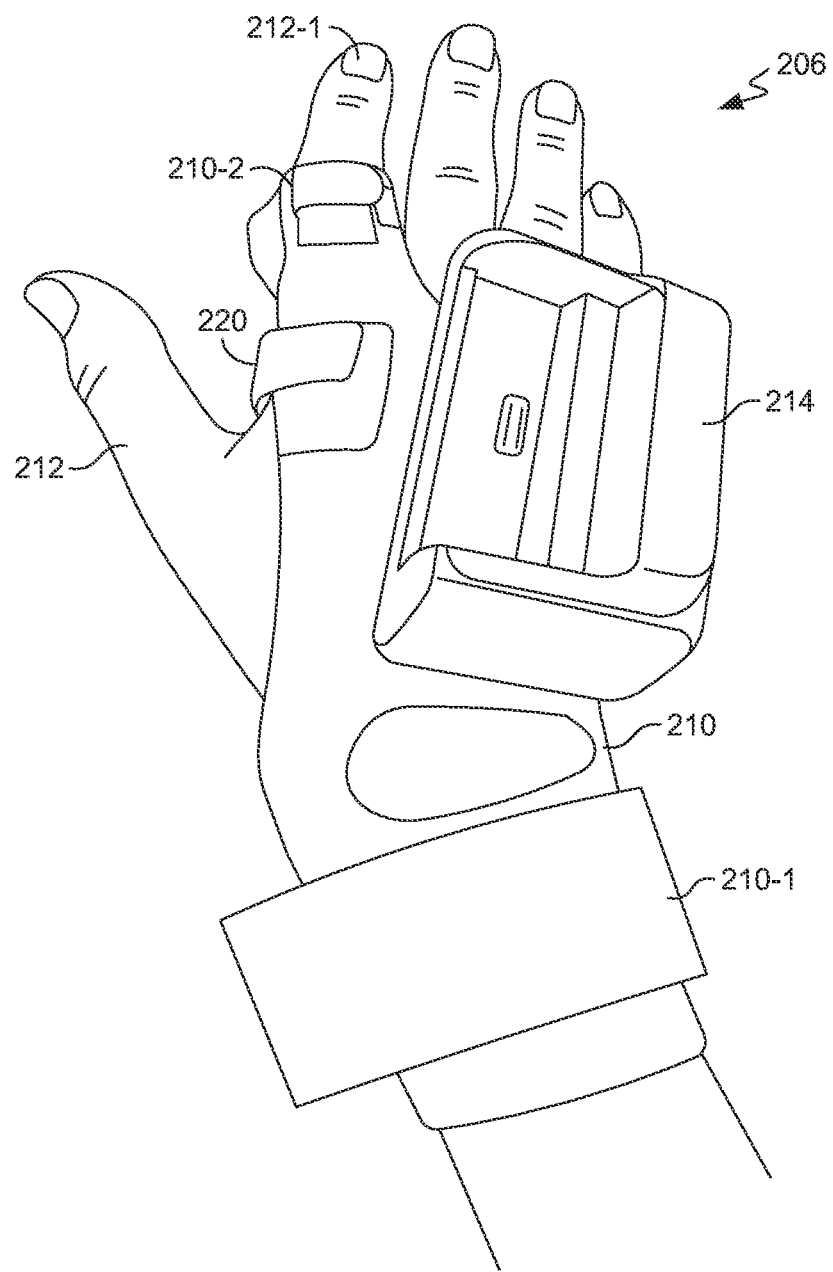
Figure 3:
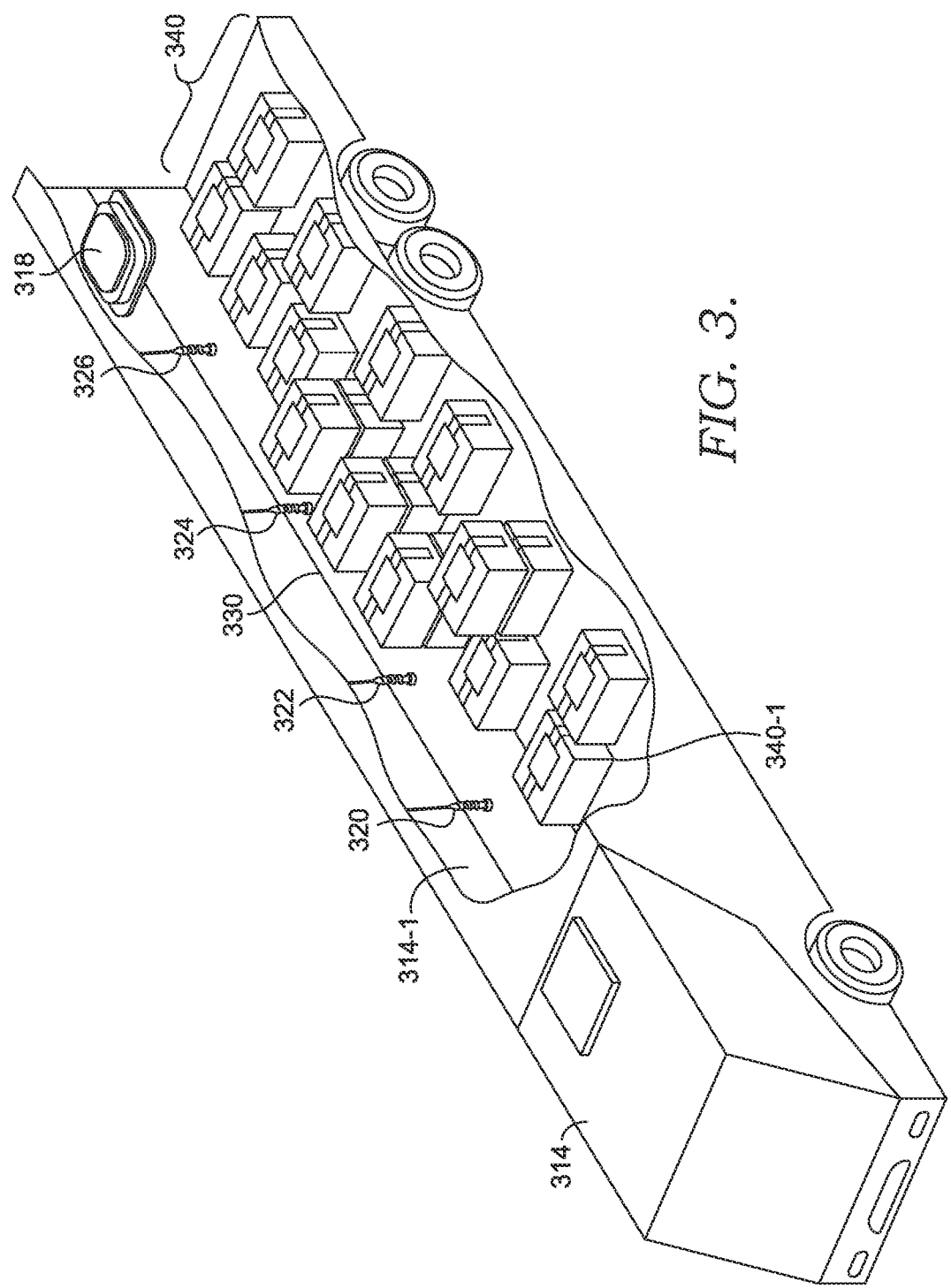
Figure 4:
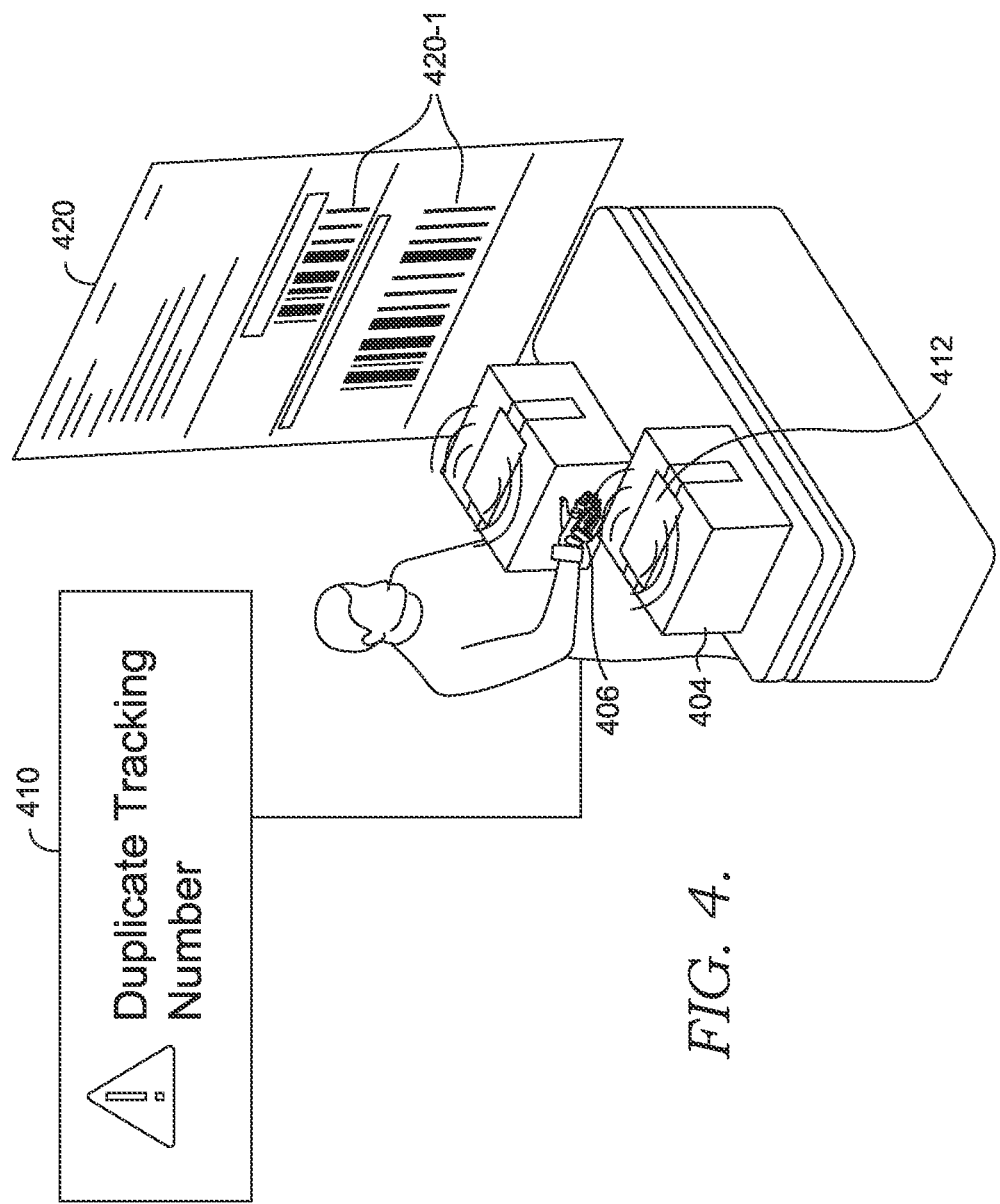
Figure 5:
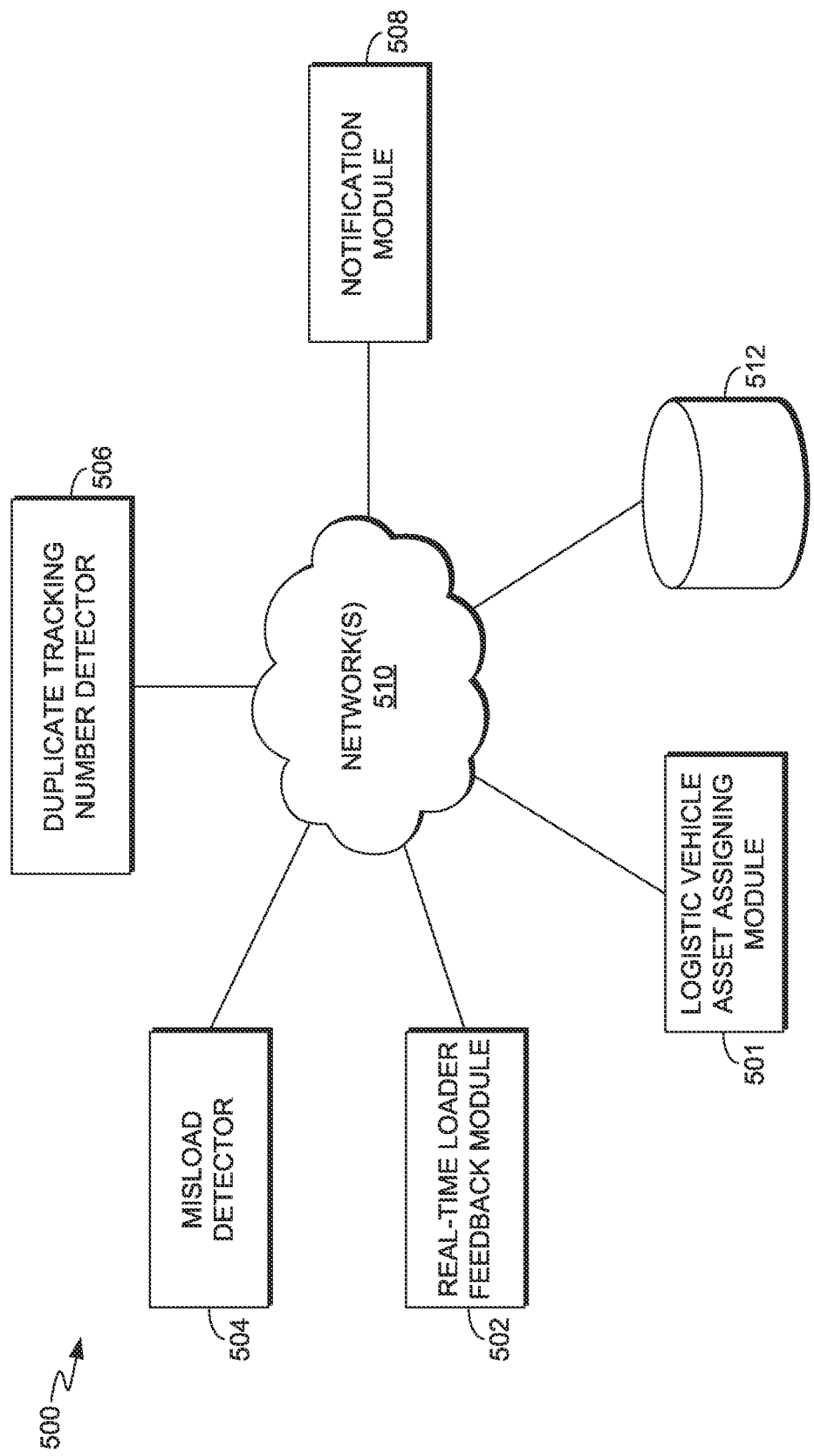
Figure 8:
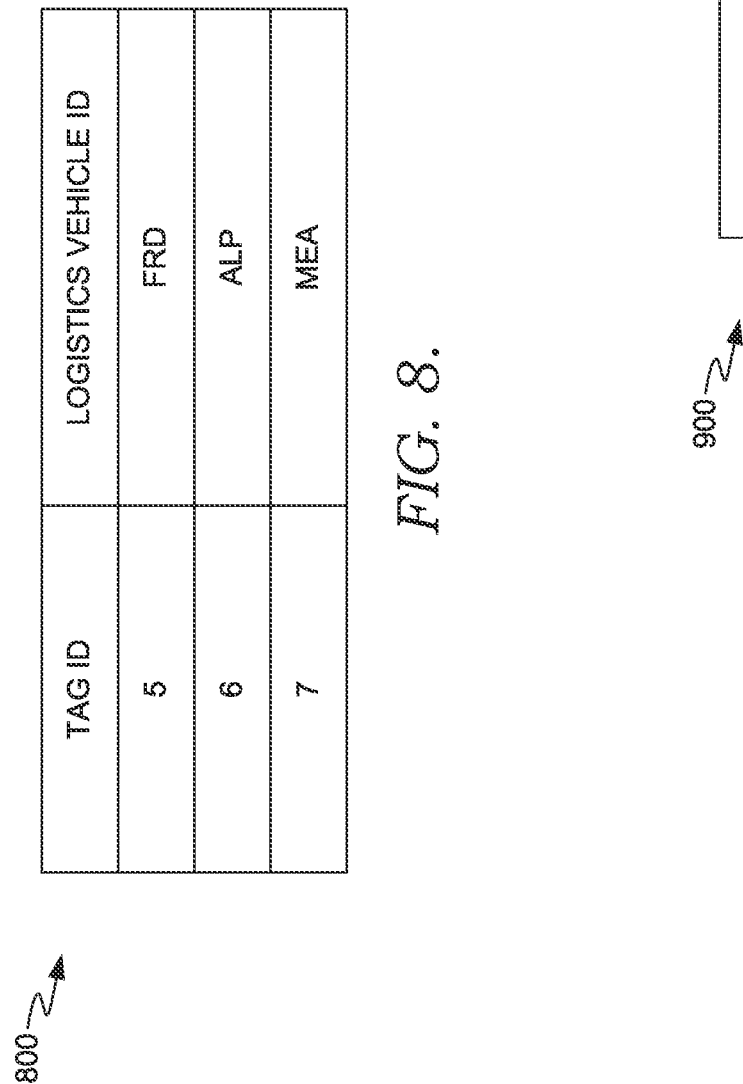
Figure 9:
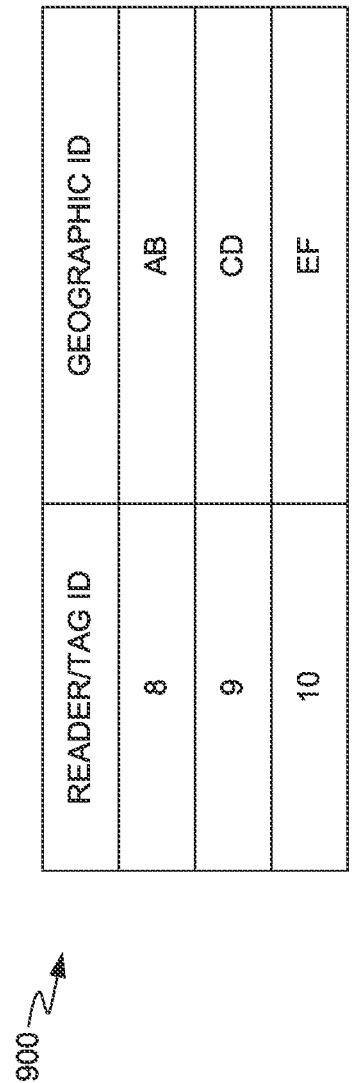
Figure 10:
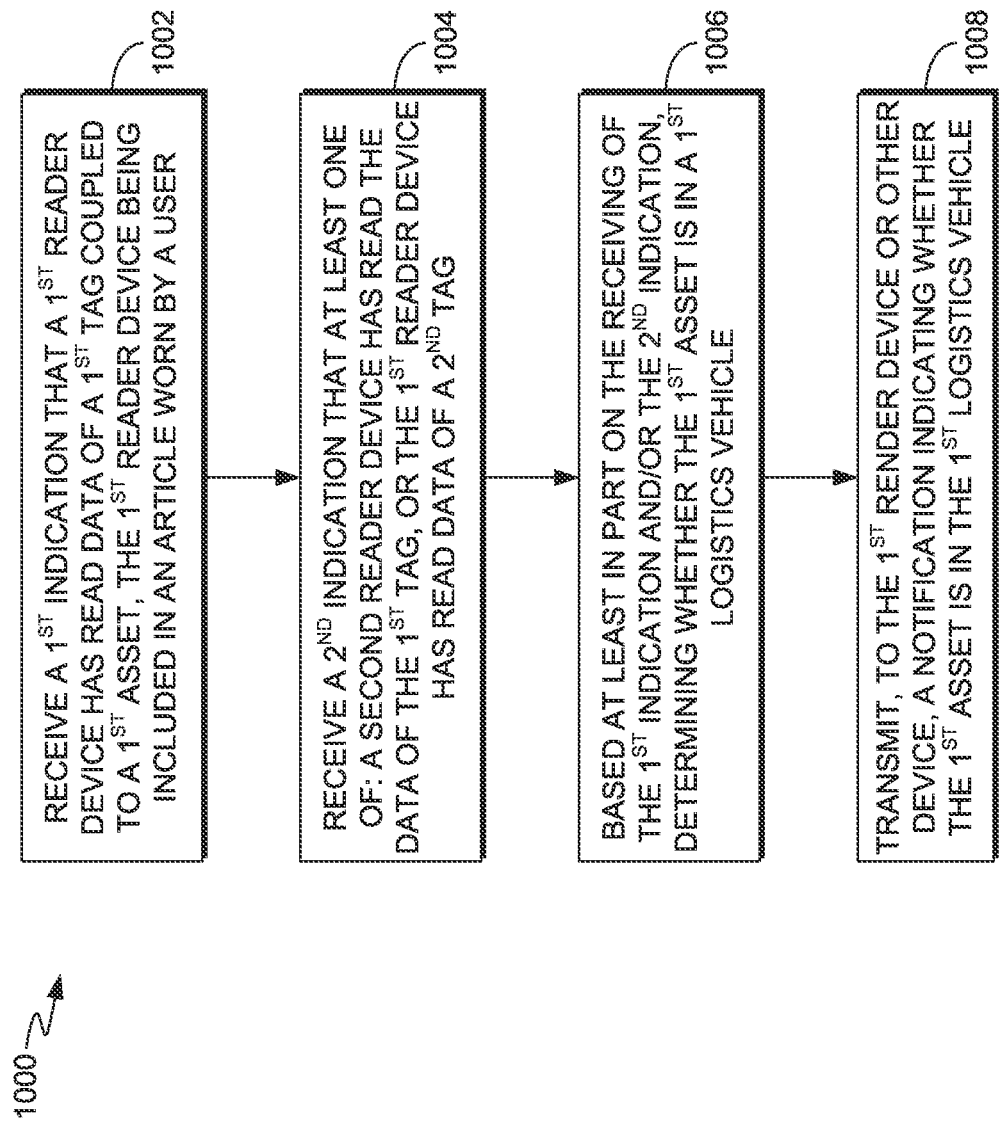
Figure 11:
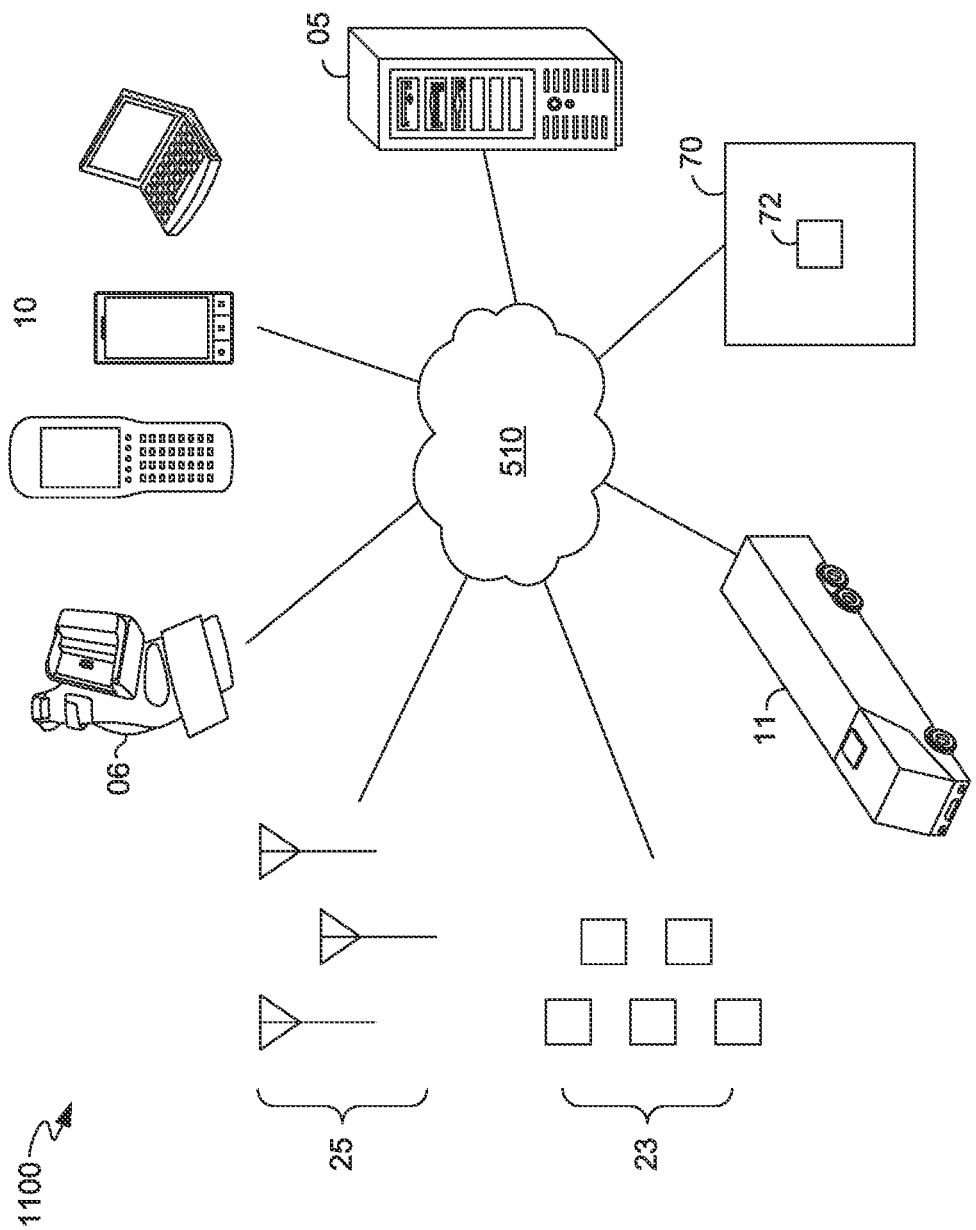
Figure 12:
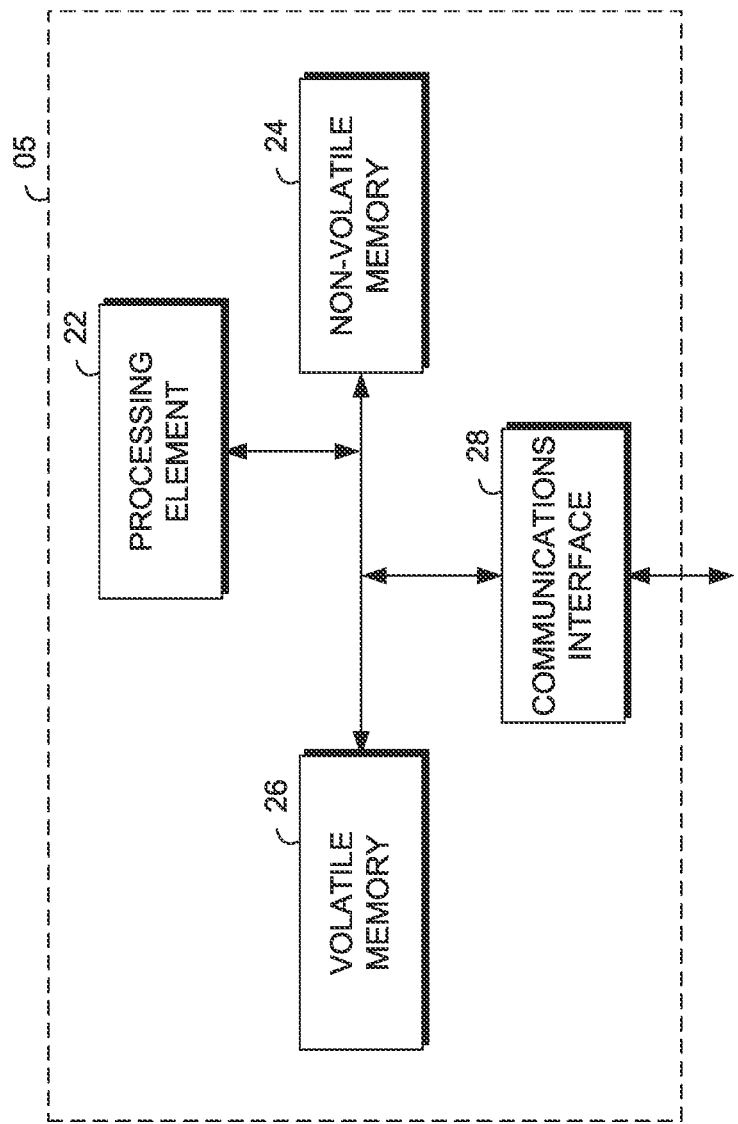
Figure 13:
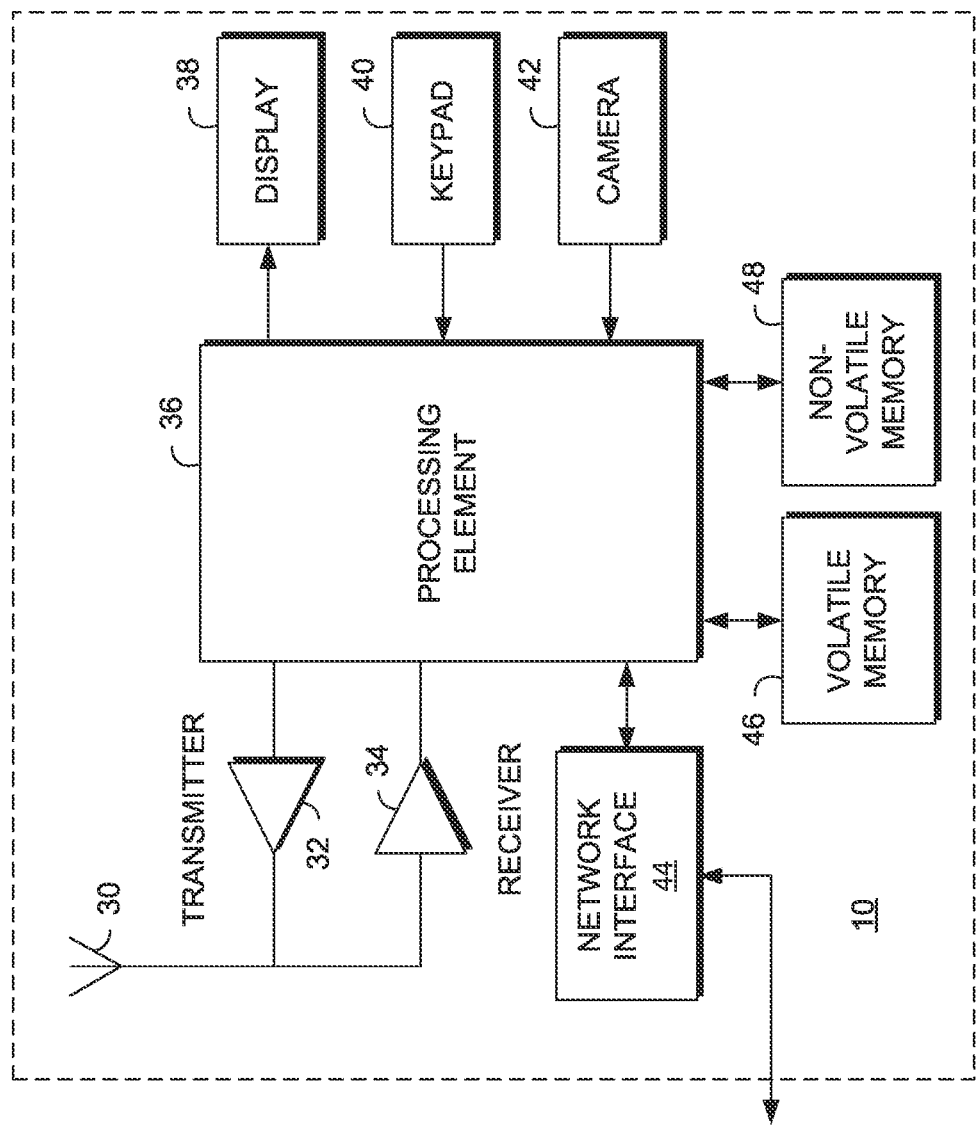

Having thus described the disclosure in general terms, reference will now be made to the accompanying drawings, which are not necessarily drawn to scale, and wherein:

FIG. 1 is a schematic diagram of an example environment for determining whether an asset is in a correctly assigned logistics vehicle or guiding a user to the correctly assigned logistics vehicle, according to some embodiments;

FIG. 2 is a schematic diagram of an example wearable user device assembly, according to some embodiments;

FIG. 3 is a schematic diagram of an example logistics vehicle, according to some embodiments;

FIG. 4 is a schematic diagram illustrating that a wearable reader device can be used to detect duplicate tracking numbers, according to some embodiments;

FIG. 5 is a block diagram illustrating an example computing system architecture suitable for implementing embodiments of the disclosure;

FIG. 6 is a schematic diagram of an example data structure for mapping a tag ID to an assigned logistics vehicle, according to some embodiments;

FIG. 7 is a schematic diagram of an example data structure for mapping a reader device ID to a logistics vehicle ID, according to some embodiments;

FIG. 8 is a schematic diagram of an example data structure for mapping a reference tag ID to a logistics vehicle ID, according to some embodiments;

FIG. 9 is a schematic diagram of an example data structure for mapping a reader device ID and/or a tag ID to a geographical ID, according to some embodiments;

FIG. 10 is a flow diagram of an example process for determining whether an asset is inside a logistics vehicle, according to some embodiments;

FIG. 11 is a schematic diagram of an example computing environment in which aspects of the present disclosure are employed in, according to some embodiments;

FIG. 12 is a block diagram of the analysis computing entity of FIG. 11, according to some embodiments; and FIG. 13 is a block diagram of the source computing entity and/or the wearable reader device of FIG. 11, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

As described above, carrier package scanning device systems have many technical problems in associating an asset to a correctly assigned logistics vehicle. Carrier package scanning devices typically require users to manually point a carrier package scanning device at a shipping label. They also typically include a mechanical trigger that, upon user decompression, activates a 2D imager (e.g., a photodiode) to read a bar code located on the shipping label and convert it into an electrical signal. Decoders of the carrier package scanning device further typically take the binary code read by the 2D imager and convert it to usable information, such as a natural language tracking number, a package identifier, or other information.

For each package a user is loading in each particular logistics vehicle, the user is typically required to manually scan, via the carrier package scanning device, each package and then provide manual computer user input associating each package to the logistics vehicle. For example, for each of 50 packages a user is to load in a first package car, the user must push the mechanical trigger at least 50 times for the carrier package scanning device to read each respective bar code. Then, for each of the 50 packages, the user must then manually input (e.g., at an electronic spreadsheet), data, which indicates that the respective package is assigned to be placed in a particular logistics vehicle.

However, due to the sheer quantity of times these carrier package scanning device technologies require manual user input, there is an increase in the likelihood that a package will be mapped (e.g., via a data structure) or assigned to the incorrect logistics vehicle, thereby increasing the likelihood of inaccuracies. Further, such sheer quantity of times these carrier package scanning devices require trigger decompression and pointing at a shipping level negatively impacts the user experience, as these steps are tedious and arduous.

Moreover, these carrier package scanning devices lack particular functionality and features. For example, these devices are not embedded in articles that are wearable (e.g., wrist bands), they do not employ alert features or functionality for indicating whether the user has placed an asset into the correct assigned logistics vehicle (or whether the user is currently heading towards the correct assigned logistics vehicle), they are not automated, and they do not employ alert features or functionality for indicating that tracking numbers are duplicates, among other problems.

Moreover, these carrier package scanning technologies unnecessarily consume computing resources. As stated above, for each package a user is loading in each particular logistics vehicle, the user is typically required to manually scan each package and then provide manual computer user input associating each package to the logistics vehicle. However, such manual computer user input increases storage device input/output (I/O), packet generation/network, costs, and the like. For example, manual data entry in these systems increase storage device I/O (e.g., excess physical read/write head movements on non-volatile disk). This is because each time a user inputs this information (because the user has to associate each package, of multiple packages, with the logistics vehicle), the computing system has to traverse a network and reach out to a storage device to perform a read or write operation. This is time consuming, error prone, and wears on components, such as a read/write head. Reaching out to disk is also very expensive because of the address location identification time and mechanical movements required of a read/write head.

As described above, location-sensing technologies, such as Global Positioning System (GPS) technologies, are incapable of, or have difficulty with, detecting assets inside a logistics vehicle, among other technical problems. The proliferation of wireless technologies, mobile computing devices, apps, and the Internet has fostered a growing interest in location-aware technologies. These technologies can locate objects using techniques such as Global Position System (GPS) triangulation or the like. Typical location-sensing technologies include static components or are limited in functionality. This can cause, among other things, inaccurate determination of whether assets are located in a logistics vehicle.

In an illustrative example, although some conventional solutions use tracking technologies, such as Global Positioning Systems (GPS) to track items, they have an inherent problem of accurately determining locations of objects inside logistics vehicles or other enclosed areas. In most indoor cases, GPS signals will be blocked or reflected by walls and have difficulty entering an enclosed area. As a result, satellite signals cannot be received properly, so it may be impossible or difficult to calculate location due to the insufficient signal strength inside the enclosed area.

To resolve these issues, particular indoor location-sensing technologies have been developed. For example, certain infrared indoor location technologies use diffuse infrared technology to realize indoor location positioning. However, the line-of-sight requirement and short-range signal transmission are two limitations that suggest it to be less than effective in practice for indoor location sensing. Ideally, wireless communication between devices occurs via a line-of-sight path (i.e., waves travel in a direct path) between transmitter and receiver that represents clear spatial channel characteristics. However, with these existing technologies, communications would not occur via a line-of-site path because of physical barriers or other interference obstacles in a logistics vehicle (e.g., multiple packages, shelves, a person walking in the logistics vehicle, etc.) between transmitter and receiver. This can cause reflection, attenuation (or fading), phase shift, and/or distortion (e.g., due to noise) of the signals among other things, thereby reducing performance, such as communication between devices based on reduced signal strength.

Various embodiments of the present disclosure provide one or more technical solutions to one or more of these technical problems described above. In operation, some embodiments include a first reader device coupled to a wearable article. For example, in some embodiments, an automated Radio Frequency Identification (RFID) reader is embedded into a wearable wrist band or glove of a human loader. Such first reader device is configured to automatically read data of one or more tags (e.g., RFID tags) coupled to one or more assets. In this way, the loading user may be able to seamlessly load assets into a correctly assigned logistics vehicle without using a carrier package scanning device, and more specifically, the user will not have to: carry the carrier package scanning device, decompress the trigger, point the carrier package scanning device, and the like.

Some embodiments additionally include at least a second reader device coupled to an interior volume of space (e.g., within a package car or inside a building a user is in). The second reader device is configured to also read the data of the one or more tags coupled to the one or more assets. For example, the second reader device may be coupled to an inside of the logistics vehicle, such that when a first tag coupled to an asset comes within a distance, communication range, or signal strength (e.g., RSSI) threshold of the second reader device or antenna of the second reader device (based on the loader loading the asset into the logistics vehicle), the second reader device reads the data of the tag.

Some embodiments additionally or alternatively include one or more reference tags coupled to the interior volume of space. For example, the reference tag may also be coupled to an inside portion of the logistic vehicle, such that when the wearable first reader device comes within a distance, communication range, or signal strength threshold of the tag (based on the loader loading an asset into the logistics vehicle), the wearable first reader device reads the data of the reference tag.

Some embodiments include a computing device (e.g., a remote server or on-chip device in the first wearable reader device) that is configured to perform various operations. For example, in some embodiments, the computing device is configured to determine or detect whether a parcel is inside a correctly assigned logistics vehicle based on the second reader device reading data from a tag coupled to an asset or the first reader device reading data from a reference tag coupled to an interior portion of the logistics vehicle. In some embodiments, in response to such determination, the computing device is configured to transmit, to the first reader device or a third device (e.g., a mobile smartphone) associated with the user, a notification indicating whether the first parcel is inside the correctly assigned vehicle is transmitted. Some embodiments additionally or alternatively provide one or more near-real time notifications or instructions that guide the user to the correctly assigned logistics vehicle in response to the wearable first reader device reading data from a tag, as described in more detail below.

Particular embodiments improve package scanning device systems. For example, particular embodiments improve the user experience, human-computer interaction, and accuracy. For example, using the illustration above, for each of 50 packages a user is to load in a first package car, the wearable reader device automatically reads a respective tag in response to an antenna of the wearable reader device and tag being within a signal strength, communication capability, or distance threshold. In this way, unlike carrier package scanning devices, the user need not push the mechanical trigger at least 50 times for the carrier package scanning device to read each respective bar code. Accordingly, one technical solution is that the wearable reader device is configured to automatically read the data from the tag, instead of requiring a manual pointing and decompression of a trigger.

Moreover, the user need not manually input (e.g., at an electronic spreadsheet), data, which indicates that the respective package is assigned to be placed in a particular logistics vehicle. Rather, another technical solution is that particular embodiments automatically access a data structure that indicates that a parcel is assigned to be placed in a particular logistics vehicle, which occurs in response to the wearable reader device reading data from a corresponding tag coupled to an asset. Accordingly, because these embodiments significantly reduce manual user input or automatically access a data structure (e.g., a lookup table), there is an increase in the likelihood that a package will be mapped or assigned to the correct logistics vehicle, thereby increasing the likelihood that the data structure will map the package to the correct logistics vehicle. Further, in some embodiments, these wearable reader devices do not require trigger decompression or pointing at a shipping label. Accordingly, these wearable reader devices positively impact the user experience and human-computer interaction, as the user simply wears the reader device and the reader device performs its functionality automatically, which is more simple, less tedious, and less arduous relative to carrier package scanning devices.

Particular embodiments improve the functionality and features of existing carrier package scanning devices. For example, in some embodiments, reader devices are embedded in articles that are wearable (e.g., wrist bands). In some embodiments, such reader devices employ alert features or functionality for indicating whether the user has placed an asset into the correct assigned logistics vehicle (or whether the user is currently heading towards the correct assigned logistics vehicle). For example, in some embodiments, such reader devices include one or more Light Emitting Diodes (LEDs), or audio feedback alerts that indicate whether a user is currently walking toward the correctly assigned logistics vehicle. In some embodiments, such reader device additionally employ alert features or functionality for indicating that tracking numbers are duplicates. One technical solution is the functionality of determining whether an asset is inside a correctly assigned logistics vehicle based at least in part on a reader device (e.g., inside a logistics vehicle or environment) having read data from a tag of an asset. Another technical solution is the functionality of determining whether a parcel is inside a correctly assigned logistics vehicle based on a wearable reader device reading data from another tag (e.g., inside a logistics vehicle or environment a user is in), which is not located on an asset. No existing carrier package scanning devices or location-based technologies currently perform this functionality. Other technical solutions are determining whether a user has transported a parcel to a logistics vehicle and/or providing near real-time feedback that guides the user to the logistics vehicle based on receiving an indication that a wearable reader device has read data from a tag and at least another reader device (e.g., within a logistics vehicle) has read the data from the same tag. Currently, no other existing solutions perform this functionality.

Moreover, particular embodiments improve computing resource consumption relative to existing carrier package scanning technologies. As stated above, for each package a user has to load in each particular logistics vehicle, the user is typically required to manually scan each package and then provide manual computer user input associating each package to the logistics vehicle. However, as described above, particular embodiments do not require such manual computer user input. Therefore, there is a reduction in storage device input/output (I/O), packet generation/network, costs, and the like. For example, automatically accessing and reading a data structure that indicates that a parcel is assigned to be placed in a particular logistics vehicle in response to a wearable reader device reading a corresponding tag reduces storage device I/O (e.g., excess physical read/write head movements on non-volatile disk). This is because the user does not have to manually associate a package with the logistics vehicle (e.g., via a spreadsheet), such as by putting in the name of the package, the name of the vehicle, destination, and the like. Accordingly, the computing system does not have to traverse a network and reach out to a storage device to perform a read or write operation. Therefore, embodiments are less error prone, and wears less on components, such as a read/write head due to the reduced mechanical movements.

Particular embodiments also improve location-sensing technologies, such as Global Positioning System (GPS) technologies, because they are capable of or are more accurate in detecting assets inside a logistics vehicle. One technical solution is one or more reader devices or reference tags coupled to an inside housing of a logistics vehicle. Another technical solution is one or more reader devices or reference tags coupled to an environment (e.g., hub walls) a user is in, which is outside the logistics vehicle. Accordingly, because these devices are coupled to an inside housing or an environment the user is in, the signals have less chance of being blocked or reflected by walls and have less difficulty entering an enclosed area, unlike GPS signals. As a result, there is sufficient signal strength between tags an readers inside the enclosed area, thereby allowing embodiments to accurately detect whether assets are in particular vehicles based on the unfettered communication and signal strength between antennas of readers and tags.

Some embodiments improve technologies, such as Active badge, via the use of tags and readers, such as RFID, which does not have strict line-of-sight requirements relative to Active badge. Some embodiments also improve these technologies via the use of multiple "reference" tags and/or reader devices inside a logistics vehicle or environment that the user is in. In this way, even if communications does not occur via a line-of-site path because of physical barriers or other interference obstacles in a logistics vehicle between a single reader device and tag, there are other tags or readers in differing positions to avoid line-of-site issues. This reduces reflection, attenuation (or fading), phase shift, and/or distortion (e.g., due to noise) of the signals among other things, thereby increasing performance, such as signal strength. Using this new infrastructure setup, some embodiments can perform new functionality by detecting whether an asset is in a particular logistics vehicle based on the proportion of tags mapped to a storage device that are currently being read by a reader device (e.g., the user's wearable reader).

Employing multiple readers and/or tags in fixed locations in different geographical areas and/or within logistics vehicles allows for redundancy checks, which improves existing technologies. The benefit of redundancy in these embodiments is that there may be multiple tags and/or readers in near positions such that any interference or noise experienced at one tag and/or reader location does not typically affect sensor readings of all of the other tags/readers. Employing multiple tags and/or readers at different locations increases the likelihood that not all reader/tag pairs will be subject to the same interference or noise at the same time, thereby allowing more accurate sensors readings for location sensing of asset tags.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Example Environment

FIG. 1 is a schematic diagram of an example environment for determining whether an asset is in a correctly assigned logistics vehicle or guiding a user to the correctly assigned logistics vehicle, according to some embodiments. The environment 100 includes a conveyor apparatus 102, a package 104 (which includes a tag 104-1), a loading user 108 that is wearing a reader device 106 and is carrying a mobile device 130 (e.g., a smart phone), one or more reference tags 110, one or more readers 112, and two logistics vehicles 114 and 116, each of which has one or more corresponding reference tags and/or readers.

In some embodiments, a "reader device" (e.g., the wearable reader device 106) as described herein is any suitable reader machine, manufacture, or module that is configured to read data (e.g., a tag ID) stored to a tag. For example, a reader device can be Radio Frequency Identification (RFID) reader, a Near-field Communication (NFC) reader, an optical scanner, an optical reader, a bar code scanner, a magnetic ink character recognition reader, a beacon reader, or the like.

In some embodiments, a reader device is a wand or includes wand functionality. A wand is an optical reader that is configured to read barcodes or other machine-readable indicia (e.g., QR codes or matrix code) and/or natural language (e.g., via Optical Character Recognition (OCR)). Wands typically capture package information on a package label, such as addresses, names, tracking numbers, and the like. In an illustrative example, a wand embedded into the wearable reader device 106 (or mounted to an inside of a logistics vehicle) is configured to automatically propagate a signal and responsively receive and read data from each label of each asset that is within a communication range. In this way, it can be determined whether a corresponding asset is in a particular logistics vehicle or being carried by a particular user. For example, the wand may receive package level information, such as destination address, originating address, and shipping entity. After decoding such information, the wand transmits, over a network, its ID, as well as the package level information. Responsively, a server maps the wand ID to a person wearing the wand or an ID of the vehicle it is located in—e.g., 114. The server additionally maps the package level information to a particular asset ID and then maps the asset ID to the logistics vehicle ID that the asset is assigned to be transported in or the ID of the person. Responsively, a misload detector determines whether the corresponding asset is within the correctly assigned logistics vehicle or the person carrying the asset. In some embodiments, the wand is additionally or alternatively configured to receive RFID tag ID by transmitting a signal which detects the tags coupled to each package.

In some embodiments, a "tag" as described herein is any physical object that stores, at minimum, an identifier that identifies the tag and/or other data, such as asset received time, planned asset pickup time, tracking number, asset activity time stamp, asset dimensions including height, length and width, asset weight, package service type, package scanned time stamp (e.g., a time at which a reader device read a tag coupled to the asset), package sort type code, package scanned code, unit load device type code, account number associated with the package, shipping origin, shipping destination, and the lie. The identifier (and potentially other data) is configured to be read by a reader device. For example, in some embodiments, a RFID tag includes an antenna or radio (for transmitting and receiving the information stored to the tag) and a RFID chip (e.g., an integrated circuit), which store's the tag's ID and/or the other data. In another example, a tag is embedded in or includes a paper label with a matrix or barcode with an encoded ID.

In some embodiments, any reader device or tag combination described herein is part of a Radio Frequency Identification (RFID) system. Accordingly, these components may include the components and functionality of RFID tags and readers, for example. RFID is a way to store and retrieve data through electromagnetic transmission to an RF compatible integrated circuit. An RFID reader device can read data emitted from or located within RFID tags. RFID readers and tags used a defined radio frequency and protocol to transmit or provide (via tags) and receive (via reader devices) data. RFID tags are categorized as at least passive or active. Passive RFID tags operate without a battery. They reflect the RF signal transmitted to them from a reader device and add information by modulating the reflected signal. Their read ranges are limited relative to active tags. Active tags contain both a radio transceiver and a battery to power the transceiver. Since there is an onboard radio on the tag, active tags have more range than passive tags. Active tags use a battery power source to broadcast their signal automatically, and a passive RFID tag does not have any power source. Passive tags only transmit RFID signals when receiving a radio frequency energy (an interrogation signal) from an RFID reader that is within range. It is noted however, that the reader devices or tags need not be a part of RFID protocols, but can alternatively or additionally include other protocols, such as BLUETOOTH LOW ENERGY (BLE), Bar codes, QR codes, and the like.

In some embodiments, a "conveyor apparatus" as described herein, such as conveyor apparatus 102, includes any suitable conveyor belt assembly that includes a conveyor belt (continuous medium that carries parcels from one location to another) one or more rollers or idlers that rotate the belt or rotate such that the parcels are moved, and/or one or more pulleys (e.g., located on the ends of the conveyor apparatus 102) that transmit drive power into the belt. A conveyor apparatus, however, need not require a "belt" but can use rollers or other mechanisms to move parcels. The conveyor apparatus 102 may include a rotating component (e.g., a belt or set of rollers) that is configured to cause movement of one or more assets for loading the one or more assets.

Continuing with FIG. 1, at a first time, in response to an antenna of the wearable reader device 106 being within a signal (e.g., RSSI) strength threshold, communication capability threshold (e.g., the ability of the antenna to receive a signal from a tag where the tag is active), and/or distance threshold of the tag 104-1 (indicative of the loader 108 approaching the asset 104 to pick it up or the conveyor 102 pushing the asset 104 close to the loader 108), the wearable reader device 106 receives and reads data from the tag 104-1. In some embodiments, in response to the reader device 106 reading the data from the tag 104, some embodiments access, over a computer network, a data structure that indicates that the parcel 104 is assigned to be placed inside the logistics vehicle 114 (and not the logistics vehicle 116). For example, in some embodiments, this includes receiving a tag ID from the tag 104-1 in response to the reading and then calling a lookup table data structure to map the tag ID to the package (i.e., 104) it is coupled to and then looking up the same or different data structure (e.g., a helper data structure) to map the package ID to the vehicle ID that the package 104 is supposed to be loaded in.

In response to such mapping and access of the data structure(s), some embodiments, guide the loader 108 to the logistics vehicle 114 via the mobile device 130 and/or the wearable user device 106. For example, some embodiments open a communication channel with loader 108's mobile device 130 (by mapping, via a data structure, the ID of the reader device 106 to an IP or MAC address of the mobile device 130) and cause a notification to be displayed, which displays an identifier identifying the correct logistics vehicle 114 that the loader 108 is supposed to load the package 104 into and/or an electronic map illustrating where the logistics vehicle 114 is. In another example, some embodiments open a communication channel with the wearable reader 106 itself and cause auditory signals (e.g., natural language directions), LED's, etc. to identify the correct logistics vehicle.

Some embodiments provide near real-time feedback to the wearable device 106 and/or mobile device 130 to guide the operator 108 to the logistics vehicle 114 via the reader device 106, the reference tag(s) 110, the reader(s) 112, the reference tag(s) 112, the reader device 118, the reference tag(s) 124, and/or the reader device 120. For example, in some embodiments, each of the reference tag(s) 110 is generally responsible for indicating or emitting/transmitting data (e.g., to the wearable reader device 130), such as an identifier that identifies the respective tag, which can be used to predict the general location of the wearable reader device 106 (or more generally the asset 140 by inference since the loader is presumable carrying the asset 104). For example, in response to the wearable reader device 106 being within a signal strength or communication capability threshold to one of the tag(s) 110 (because the operator 108 is walking past that area), the wearable reader device receives and reads one of the tags 110. Responsively, particular embodiments map (e.g., via a lookup data structure) the respective tag(s) 110 an environment ID (e.g., an area within a hub) that the tag(s) 110 is located In. Responsively, particular embodiments can infer that the loader 108, for example, is in the corresponding environment and is heading toward the correct logistics vehicle 114. Responsively, particular embodiments, for example, cause display of feedback to the mobile device 130, such as "keep walking in that direction," or "move south immediately, you are heading towards the wrong logistics vehicle."

In another example, indications that a subset of specific reader devices 112 are reading data from the tag 104-1 can indicate that the tag 104-1 is located in a particular geographical area (e.g., a particular room or section of a building) based on a predefined mapping data structure that associates each reader device with a room. The tag(s) 110 and/or reader device(s) 112 are placed in any suitable physical environment, geographical area, and/or apparatus (e.g., the conveyor 102) within such physical environment or geographical area. The tag(s) 110 and/or the reader device(s) 112 can be coupled to or placed in any suitable location, such as on the ceiling of a building in a hub, on the floor of the building, on the walls of a building, and/or any structure, position, or orientation within a geographical area.

Some embodiments additionally determine or detect whether the package 104 is inside the logistics vehicle 114 and/or 116 via the use of the wearable reader device 106, the tag 104-12, the reference tag(s) 122, the reader device 118, the reference tag(s) 124, and/or the reader device 120. For example, in response to receiving an indication that the reader device 118 is within a signal strength, communication capability, and/or distance threshold to the tag 104-1, the reader device 118 receives and reads data from the tag 104-1. In response to receiving an indication of this read, or the receipt of the tag ID of 104-1, particular embodiments detect that the package 104 is inside the logistics vehicle 114 (since the package 104 is mapped, via a data structure, to the ID of the tag 1040-1) and store, in computer memory or as a data record (e.g., a database row), data indicating that such package 104 has been loaded into the correct logistics vehicle 114.

In some embodiments, the reference tag(s) 122 is additionally or alternatively used to make the same inference that the package 104 is located inside the logistics vehicle 114. For example, in response to the wearable reader device 106 being within a signal strength, communication capability, and/or distance threshold to the tag(s) 122 (presumably because the loader 108 has loaded or is inside the logistics vehicle 114 loading the package 104), the reader device 106 reads data from the tag(s) 122. In response to receiving an indication of this read of the tag ID(s) of 122, particular embodiments detect that the package 104 is inside the logistics vehicle 114 (since the tag(s) 122 are mapped, via a data structure, to the logistics vehicle 114 and the wearable reader device 106 is mapped to the package 104 based on the wearable device 106 reading the tag 104-1) and store, in computer memory or as a data record (e.g., a database row), data indicating that such package 104 has been loaded into the correct logistics vehicle 114.

In some instances, the wearable reader device 106 reads data from some of the reference tags 122 and 124 inside both logistics vehicles 114 and 116 (and/or some of the tag(s) 110). In these instances, some embodiments perform an arithmetic algorithm to detect the quantity of reads of both logistics vehicles (or other areas outside of the logistics vehicles), compare the quantities, and the logistics vehicle (or area) with the highest quantity of tag reads is predicted to be the logistics vehicle (or area) that the package 104 is located in. For example, the wearable reader device 106 may read 10 tags inside the logistics vehicle 114, but only 5 tags inside the logistics vehicle 116. Because 10 is higher than 5, the package 105 is predicted to be located in the logistics vehicle 114. In some embodiments, signal strength between the wearable reader device 106 and the tags(s) 122 and 124 is alternatively or additionally used. In these embodiments, the signal strength is compared between readings of each vehicle and it is predicted that the package 104 is inside a particular logistics vehicle based on the highest signal strength between the wearable reader device 106 and the respective tag(s) 122 and 124 of the respective vehicles 114 and 116.

In a similar situation, in some instances, the reader devices 118 and 120 (and/or 112) will both read the data from the tag 104-1. In these instances, some embodiments perform arithmetic to detect the quantity of reads of both logistics vehicles, compare the quantities, and the logistics vehicle with the highest quantity of tag reads is predicted to be the logistics vehicle that the package 104 is located in. For example, the logistics vehicle 114 may have 10 reader devices 118 that read the tag 104-1, whereas the logistics vehicle 116 has 5 reader devices 120 that read the tag 104-1. Because 10 is higher than 5, the package 104 is predicted to be located in the logistics vehicle 114. In some embodiments, signal strength between the reader device 118/reader device 120 and the tags 104-1 is alternatively or additionally used. In these embodiments, the signal strength is compared between readings of each vehicle and it is predicted that the package 104 is inside a particular logistics vehicle based on the highest signal strength between the reader device 118 and tag 104-1 and the reader device 120 and the tag 104-1.

As has been described herein, particular embodiments generate and derive one or more data structures that provide mappings in order to know which reader devices and/or tags belong to which environment (e.g., specific geo-coordinates in a hub or in a specific logistics vehicle). Such data structures can additionally provide mappings in order to know which user devices (e.g., mobile device 130) belong to which users, and which packages are coupled to which tags. Such data structures can be or include any suitable data structure, such as a lookup table, a hash map, a list, or the like. In an illustrative example, a lookup table or hash map may include a key column that lists each ID of each logistics vehicle. And for each ID, there is a list of other tag IDs representing each tag that is coupled to a particular logistics vehicle.

III. Example Wearable Reader Device

FIG. 2 is a schematic diagram of an example wearable user device assembly 206, according to some embodiments. In some embodiments, the wearable user device assembly 206 represents the wearable user device 106 of FIG. 1. As illustrated in FIG. 2, the wearable user device assembly 206 includes the reader device 214, which is coupled to the wearable article 210 (which includes the wrist fastener 210-1 and the index finger fastener 210-2).

As illustrated in FIG. 2, the wearable article 210 includes the wrist fastener 210-1, the palm fastener 220, and the index finger fastener 210-2. In some embodiments, the wrist fastener 210-1 includes a first end that includes a "hook" end of a hook and loop fastening system and a second end that includes a "loop" end of the loop fastening system such that when the hook end is coupled to the loop end, the wearable article 210 is more securely fitted to the wrist of the user, as illustrated in FIG. 2. Similarly, in some embodiments, the palm fastener 220 includes a first end that includes a "hook" end of a hook and loop fastening system and a second end that includes a "loop" end of the loop fastening system such that when the hook end is coupled to the loop end, the wearable article 210 is more securely fitted to the palm or hand of the user, as illustrated in FIG. 2.

In some embodiments, the index finger fastener 210-2 is configured to receive the index finger 212-1 of the user's hand 212. In some embodiments, such placement of the index finger 212-1 inside the index finger fastener 212-2 (e.g., an extended sheath or aperture) provides a friction based fit so as to more firmly secure the hand 212 to the wearable article 210. In some embodiments, the index finger fastener 210-2 additionally includes another hook and loop fastener system to more firmly secure the hand 212 to the wearable article 210. As illustrated in FIG. 2, in some embodiments, the wearable article 210 only includes a single index finger fastener 212-1 but no other finger fasteners such that there is a "cut out" or large aperture for the user's other fingers to freely extend through the wearable article 210. This has utility in that the user can more freely move the user's fingers so as to better clasp and load assets.

In some embodiments, the reader device 214 includes a computing device (e.g., at least one processor and memory (e.g., RAM or flash)) that is connected to one or more sensors and/or other I/O devices. For example, in some embodiments, the reader device 214 includes a RFID reader (which includes an antenna to send signals that are picked up by a tag, where the tag provides its ID to the reader device). In some embodiments, the reader device 214 includes additional or alternative readers, such as an optical scanner reader that is configured to read machine-readable indicia encoded to a shipping label, such as bar codes. In some embodiments, the I/O devices connected to the computing device are any suitable sensor or device, such as an object detection camera, one or more Light Emitting Diodes (LED), a speaker (e.g., a virtual assistant or smart speaker device) and/or the like.

In an illustrative example of an I/O device, in some embodiments, an object detection camera is configured to capture live video streams and/or images and feed such images to a Convolutional Neural Network (CNN) or object detection model in order to scan the environment that the user is in so as to guide the user to the correct logistics vehicle. For example, some machine learning model embodiments generate a bounding box that defines the boundaries and encompasses a computer object representing a feature (e.g., a conveyor, a logistics vehicle, an asset, etc.) in the real world. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect real world objects. In an illustrative example, the object detection camera can capture a video stream and a model places a bounding box over, each object that a user walks by or is next to in order to map out the location that the user is in by comparing a base map (e.g., a High Definition (HD) map) to an environment detected by the camera. Then, based on such comparison, it can be determined where the user is and instructions can responsively be provided to the wearable reader device assembly 206 and/or user device to guide the user to the correctly assigned logistics vehicle.

Alternatively or additionally, in some embodiments the reader device 214 includes one or more LEDs that are configured to light up at a particular intensity or particular color in response to receiving an indication of an action. For example, referring back to FIG. 1, in response to receiving an indication that the wearable reader device 106 has read the tag(s) 122, the wearable reader device 106 communicates with a server, which looks up, in a data structure, which logistics vehicle the tag(s) 122 are located in. Based on such determination and a determination that the logistics vehicle 144 is the correctly assigned vehicle for the asset 102, some embodiments (e.g., the server) transmits a control signal back to the reader device 106, which causes the LEDs to light up at a particular color or intensity, thereby indicating, to the user, that the user placed the asset in the correctly assigned logistics vehicle.

Alternatively or additionally, in some embodiments the reader device 214 includes a speaker device configured to produce auditory feedback (e.g., beeping or voice assistant natural language speech) in response to receiving an indication of an action. For example, referring back to FIG. 1, in response to receiving an indication that the wearable reader device 106 has read the tag(s) 122, the wearable reader device 106 calls a server, which looks up, in a data structure, which logistics vehicle the tag(s) 122 are located in. Based on such determination and a determination that the logistics vehicle 144 is the correctly assigned vehicle for the asset 102, some embodiments (e.g., the server) transmits a control signal back to the reader device 106, which causes natural language feedback indicating, to the user, that the user placed the asset in the correctly assigned logistics vehicle.

IV. Example Logistics Vehicle

FIG. 3 is a schematic diagram of an example logistics vehicle 314, according to some embodiments. In some embodiments, the logistics vehicle 314 represents the logistics vehicle 114 or 116 of FIG. 1. As such, for example, in some embodiments, the RFID reader 318 (and/or each of the antennas 320, 322, 324, and 326) represents the reader device 118 of FIG. 1. As illustrated in FIG. 3, the logistics vehicle 314 includes the array of assets 340 (including asset 340-1), the RFID reader device 318 coupled to (or build within) the sidewall 314-1 of the logistics vehicle 314, and four antennas—320, 322, 324, and 326—that are communicatively coupled to each other and the RFID reader device 318 via the common bus or communications link 330. The communications link 330 is a wired connection coupled to (or build within) the sidewall 314-1 of the logistics vehicle 314 and connects to each of the RFID antennas 320, 322, 324, and 324 so as to relay to readings to or from the RFID reader 318. It is understood, however, that a wired connection may not be required, but any suitable communication link can be established (e.g., BLUETOOTH) between antennas.

In some embodiments, one or more RFID antennas (e.g., RFID antenna 320) is a transceiver that is configured to both interrogate, by transmitting a signal to, one or more tags located with the asset array 340 and responsively receive, from a corresponding tag coupled to a respective asset, a corresponding tag ID (or other data). In some embodiments, however, one or more RFID antennas is only a receiver, which is configured to passively receive (and not transmit) RFID tag IDs from respective tags.

The RFID reader device 318 is configured to receive, via the communications link 330 and from each of the antennas 320, 322, 324, and 326, a respective RFID tag ID (and/or other data) and then read or decode such tag ID. For example, in response to the antenna 320 being within a communication range threshold (corresponding to a distance threshold) to the asset tag of the package 340-1, the tag coupled to the package 340-1 transmits, via a separate antenna, its ID to the RFID antenna 320. The RFID antenna 320 responsively transmits the tag ID through the communications link 330 to the RFID reader device 318, which then reads or decodes the tag ID.

As illustrated in FIG. 3, there are multiple antennas 320, 322, 324, and 326 that are evenly spaced out within the logistics vehicle 314 such that the RFID reader device 318 is able to capture signals from a tag coupled to an asset located in any position within the logistics vehicle 314. In other words, in some embodiments, any one given antenna has a transmitting and/or receiving range capacity for communicating with a tag relative to its specific position. For example, the antenna 326 may only be able to transmit an interrogation signal to areas that include the half of the logistics vehicle 314 that the antenna 326 is located in. Accordingly, the antenna 326 may not be able to transmit a signal to a tag coupled to the package 340-1. Therefore, particular embodiments additionally employ antennas 326, 324, and/or 322 so as to provide a greater transmission and/or receiving range for a wider lens of visualization within the logistics vehicle 314.

In some embodiments, in response to the RFID reader device 318 decoding or reading each tag ID derived from a corresponding antenna, such as 320, the RFID reader device 318 transmits (e.g., via the antenna 326), over a network, the tag ID and its own ID, to a central server or other device (e.g., a cloud computing node), which then associates the tag ID to the corresponding package and RFID reader device 318 ID to the particular logistics vehicle 314. For example, a server may perform a lookup, at a data structure, of the RFID reader device 318 ID (a key in a key-value pair structure) to map its ID to an ID (a value in the key-value pair structure) of a logistics vehicle it belongs in. The server may additionally map the received tag ID to a corresponding package. Based on these mappings, the server infers that the package 340-1, for example, is located within the logistics vehicle 314. It is understood, however, that in some embodiments, such backend server functionality is alternatively performed at the RFID reader device 318 itself or other computing device local to or within the logistics vehicle 314.

V. Example Duplicate Tracking Number Functionality

FIG. 4 is a schematic diagram illustrating that a wearable reader device can be used to detect duplicate tracking numbers, according to some embodiments. In some embodiments, the reader device 406 represents the reader device 106 of FIG. 1 or the reader device assembly 206 of FIG. 2. In some instances, different shipping labels (or tags) of different assets may include duplicate (the same) tracking numbers. This may be due to various factors, such as fraud. For example, a shipping user may pay for a single shipment and label but prints out multiple copies of the same label to attach to multiple packages even though they have only paid for a single label. In another example, the same shipping labels may inadvertently be printed and attached to different packages. In either case, the wearable reader device 406 may be used to detect duplicate tracking numbers.

Based on an antenna of the wearable reader device 406 being within a communication range threshold, signal strength threshold, and or distance threshold relative to the tag 412, the reader device 406 automatically reads the data from the tag 412 (in response to the antenna of the reader device 406 receiving data from the tag 412) and/or automatically reads the machine readable indicia 420-1 from the shipping label 420. The shipping label 420 is attached to the package 404. Responsively, in some embodiments, a decoder within the wearable reader device 406 decodes the machine-readable indicia 420 to receive its decoded data, such as a tracking number. In some embodiments, the wearable reader device 406 then transmits, via its antenna and over a computer network, the decoded tracking number to a server, which then compares the tracking number to other tracking numbers for which the same wearable reader device 406 and/or a different wearable reader device has read in the past prior to the current read. Based on such comparison, if there is a match/duplicate detected between the historical tracking numbers read and the tracking number decoded in the machine-readable indicia 420-1, the server sends a control signal back to the wearable reader device 410 and/or to a user device, such as the mobile device 103 of FIG. 1, which causes one or more of these devices to display (or otherwise provide) the notification 410 indicating that duplicate tracking numbers have been detected.

In some embodiments, such notification 410 of duplicate tracking numbers alerts clerks to bill the customer correctly upstream (e.g., bill the customer for each duplicate found). In some embodiments, such notification 410 additionally or alternatively alerts clerks or other personnel of potential fraud. As such, for example, the notification 410 can include the name of the customer, the name of the person responsible for attaching the shipping label, and/or other contact information (e.g., email address, phone number) of the customer so that personnel can intercede when potential fraud is involved. In some embodiments, the tag 412 itself includes the tracking number or any of the machine-readable indicia 420-1 such that the wearable reader device 406 does not read the machine-readable indicia 420-1 on the shipping label 420 but only reads data from the tag 412. In some embodiments, the wearable reader device 406 performs all of the functionality describe above for detecting duplicate tracking, as opposed to offloading the functionality to a server.

VI. Example Computing System Architecture

Referring now to FIG. 5, a block diagram illustrating an example computing system architecture (referred to as the "system 500") suitable for implementing embodiments of the disclosure. The system 500 is generally responsible for detecting whether a particular asset is within a particular logistics vehicle. The system 500 includes a logistics vehicle asset assigning module 501, a real-time loader feedback module 502, a misload detector 504, a duplicate tracking number detector 506, a notification module 508, and storage 105, each of which is communicatively coupled to each other via one or more networks 510. The network(s) 110 is any suitable network(s), such as a Local Area Network (LAN), a Wide Area Network (WAN), the internet, or a combination of these, and/or include wired, wireless, or fiber optic connections. In general, network(s) 510 represent any combination of connections (e.g., APIs or linkers) or protocols that will support communications between the components of the system 500. In some embodiments, the components of the system 500 are embodied as a set of compiled computer instructions or functions, program modules, computer software services, logic gates, or an arrangement of processes carried out on one or more computer systems.

The logistics vehicle asset assigning module 501 is generally responsible for associating (e.g., via a data structure) an asset to a specific logistics vehicle for a loader to load the asset in. In other words, the asset assigning module 501 assigns an asset to a particular logistics vehicle for loading. In some embodiments, this is done automatically. In other embodiments, this is done based on receiving user feedback. For example, a clerk at a hub or logistics store may scan, via a reader device, a tag or label on an asset, which identifies the asset. Based on a destination for a logistics vehicle being in a particular state and the asset going to that state (as indicated in the tag or label), the clerk may indicate that the asset is to be loaded in the specific logistics vehicle, which may cause a data structure to associate the asset with the logistics vehicle.

The real-time loader feedback module 502 is generally responsible for providing near real-time feedback to a user device (e.g., the mobile device 103) and/or a wearable reader device associated with a user that indicates whether an associated user heading towards the correctly assigned vehicle (as determined via the logistics vehicle asset assigning module 501). For example, referring back to FIG. 1, and as described herein, the reference tag(s) 110 and/or the reader device(s) 112 can be used to detect whether the user 108 is approaching the correctly assigned logistics vehicle 114. In an illustrative example, in response to a subset of the reader devices 112 being within a communication range of the tag 104-1 of the asset 104 (based on the subset of reader devices being able to read data from the tag 104-1), where the subset or reader devices is located near the logistics vehicle 114, the real-time loader feedback module 502 associates, via one or more data structures, the reader device IDs of the subset to a particular location next to the logistics vehicle 114, and then associates the tag ID of tag 104-1 to logistics vehicle 114 (based on functionality of the logistics vehicle asset assigning module 501) to determine the correctly assigned logistics vehicle. Accordingly, the real-time loader feedback module 502 responsively predicts or infers that the asset 104 is headed towards the correctly assigned logistics vehicle 114 and programmatically calls, for example, the notification module 508, which causes a notification to responsively be made to a user device or wearable reader device such as, "you are heading towards the correct logistics vehicle." In some embodiments, this same logic and functionality is applied when the user is headings towards an incorrectly assigned logistics vehicle. For example, the subset of the reader device described above may be mapped to and closer to the logistics vehicle 116. Accordingly, a notification can be transmitted, which indicates that the user is heading towards the incorrect logistics vehicle for loading.

The misload detector 504 is generally responsible for detecting misloads—i.e., whether a particular asset is inside a correctly assigned logistics vehicle or whether the asset has been transported to a correctly assigned logistics vehicle. In some embodiments, such detection is based at least in part on readings from the reader device 118, the tag(s) 122 of FIG. 1, and/or the reader device 318 of FIG. 3. For example, referring back to FIG. 3, in response to receiving an indication that the reader device 318 has read or decoded data located within the tag of the asset 340 (in response to the antenna 320 receiving a tag ID from the tag), the misload detector 504 determines or predicts (via a confidence score) that the asset 340-1 is located in the logistics vehicle 314. In another example, referring back to FIG. 1, in response to receiving an indication that the wearable reader device 106 has read data of the reference tag(s) 122, the misload detector 504 generates a score indicating a confidence level or prediction that the asset 340-1 is located inside the logistics vehicle 314.

The duplicate tracking number detector 506 is responsible for detecting duplicate tracking numbers among multiple assets. In some embodiments, the duplicate tracking number detector 506 performs its functionality, as described with respect to FIG. 4. In an illustrative example, in response to receiving an indication that the wearable reader device 406 has read the data from the tag 412, some embodiments read—from the machine-readable indicia 420-1—a first tracking number, and transmit—to a device hosting the duplicate tracking number detector 506—a first tracking number, the duplicate tracking number detector 506 compares the first tracking number to other tracking numbers read by other wearable reader devices. If there is a match, for example, the duplicate tracking number detector 506 programmatically calls the notification module 508 to provide the notification 410.

The notification module 505 is generally responsible for providing one or more notifications (e.g., visual display prompts or audio feedback) in association with the real-time loader feedback module 502, the misload detector 504, and/or the duplicate tracking number detector 506. For example, in response to the misload detector 504 detecting that an asset is inside a logistics vehicle, which is not assigned for the asset, the misload detector 504 programmatically calls, over the network(s) 510, the notification module 508, which then causes an alert to be provided, such as display of natural language indicia that reads, "you have placed package XYZ inside the incorrect package car. Please place inside package inside package car ABC."

The system 500 also includes storage 512. In some embodiments, the storage 512 represents any storage device, such as RAM, cache, flash, disk, etc. In some embodiments, the storage 512 represents any storage system, such as RAID or a Storage Area Network (SAN). In some embodiments, the storage 512 represents alternative or additionally data stores, such as a relational database, a graph database, and the like. In some embodiments, any of the data structures and logic described herein is stored to the storage 512.

VII. Example Data Structures

FIG. 6 is a schematic diagram of an example table 600 for mapping a tag ID to an assigned logistics vehicle, according to some embodiments. In some embodiments, the data structure 600 (e.g., a hash map or lookup table) is what the logistics vehicle asset assigning module 501 reads or writes to in order to assign a particular asset to be loaded into a particular logistics vehicle. For example, referring back to FIG. 1, in response to the wearable reader device 106 reading or decoding a tag ID—tag ID 1—of the tag 104-1, the wearable reader device 106 transmits, to a server, the tag ID 1 and the server looks up the table 600 using the tag ID 1 as a key in order to map the tag ID to both the asset ID—B—and the assigned logistics vehicle—XJ5.

FIG. 7 is a schematic diagram of an example table 700 for mapping a reader device ID to a logistics vehicle ID, according to some embodiments. In some embodiments, the data structure 700 (e.g., a hash map or lookup table) is what the misload detector 504 reads or writes to in order to detect misloads or whether an asset is inside a correctly assigned logistics vehicle. For example, referring back to FIG. 1, in response to the reader device 118 reading the tag ID of the tag 104-1 (because the asset 104 is presumably now within the logistics vehicle 114), the reader device 118 transmits, over a network, its ID, 1, as well as the tag ID of the tag 104-1 to a central server. The server then looks up the table 700 using the transmitted reader device ID 1 as a key in order to map the reader device ID to the logistics vehicle ID of the logistics vehicle it is located in—TXL. The server then calls a function to lookup the data structure 600 in order to check if the received tag ID maps to the same vehicle as the reader device ID. If there is a same match between the logistics vehicle IDs, then the misload detector 504 generates a score indicative of a high probability that a particular asset is inside its correctly assigned logistics vehicle.

FIG. 8 is a schematic diagram of an example table 800 for mapping a reference tag ID to a logistics vehicle ID, according to some embodiments. In some embodiments, the data structure 800 (e.g., a hash map or lookup table) is what the misload detector 504 reads or writes to in order to detect misloads or whether an asset is inside a correctly assigned logistics vehicle. For example, referring back to FIG. 1, in response to the wearable reader device 106 reading the tag ID of the reference tag 122 (because the wearable reader device 106 is presumably now within the logistics vehicle 114), the wearable reader device 106 transmits, over a network, its ID, 1, as well as the tag ID, 5, to a central server. The server then looks up the table 800 using the transmitted tag ID 5 as a key in order to map the tag ID 5 to the logistics vehicle it is located in-FRD. The server then calls a function to lookup the data structure 600 in order to check if the received tag ID 5 maps to the same vehicle as the received tag ID derived from the tag 104-1 of the asset 104. If there is a same match between the logistics vehicle IDs, then the misload detector 504 generates a score indicative of a high probability that a particular asset is inside its correctly assigned logistics vehicle.

FIG. 9 is a schematic diagram of an example table 900 for mapping a reader device ID and/or a tag ID to a geographical ID, according to some embodiments. In some embodiments, a "geographical ID" is any suitable predefined area, such as a room, a section, a building, or the like. In some embodiments, the data structure 900 (e.g., a hash map or lookup table) is what the real-time loader feedback module 502 reads or writes to in order to provide near real-time feedback to a user device indicating whether a user is heading to a correctly assigned logistics vehicle.

For example, referring back to FIG. 1, in response to the wearable reader device 106 reading the tag ID of the reference tag(s) 110 (because the wearable reader device 106 is presumably near or within a communication range of the reference tag(s) 110), the wearable reader device 106 transmits, over a network, its ID, 1, as well as the tag ID, 8, and tag ID 1 of the tag 104-1 to a central server. The server then looks up the table 900 using the transmitted tag ID 8 as a key in order to map the tag ID 8 to the geographical area it is attached to—AB. The server then calls a function to lookup the data structure 600 in order to check what logistics vehicle the received tag ID 1 maps to. The server then compares the logistics vehicle ID and its location to a location that the tag ID8 is associated with, such as via a network graph. In some embodiments, the server then computes a distance (e.g., a network graph distance) and/or a direction of travel indication (based on prior readings of other reference tag(s) 110) between the locations and if they are within a distance threshold or heading threshold, the server causes a notification to be transmitted that the user is heading in a direction of the correctly assigned logistics vehicle.

VIII. Example System Operation

FIG. 10 is a flow diagram of an example process 1000 for determining whether an asset is inside a logistics vehicle, according to some embodiments. In some embodiments, the analysis computing entity 05 of FIG. 11 performs the process 1000. In other embodiments, the wearable reader device 06 performs the process 1000. In yet other embodiments, the combination of the analysis computing entity 05 and the wearable reader device 06 performs the process 1000. The process 1000 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, the process 1000 may not include block 1008. The computer-implemented method, the system (that includes at least one computing device having at least one processor and at least one computer readable storage medium), and/or the computer program product/computer storage media as described herein may perform or be caused to perform the process 1000, and/or any other functionality described herein.

Per block 1002, some embodiments receive a first indication that a first reader device has read data of a first tag coupled to a first asset. In some embodiments, the first reader device is included in or coupled to an article worn by a user. For example, such "article" may be or include the wearable article 210 of FIG. 2. However, the article can be any suitable wearable article, such as a headband, a watch band, an arm band, a glove, a shirt, a belt attachment, or the like. In some embodiments, an "indication" described herein refers to any suitable value of set of values, such as a flag, Boolean, float or other value that identifies a tag or reader device. For example, the receiving of the first indication that the first reader device has read the data of the first tag can simply mean receiving, by a server, a tag ID (or other data) of a tag that the first reader device has read. Such tag ID itself is an "indication" that the first reader device has read the data from the first tag. In other embodiments, the receiving of the indication means receiving both the tag ID, a reader device ID of the first reader device.

In some embodiments, the article is configured to be worn over at least a portion of the user's hand, as illustrated, for example with respect to the wearable article 210 of FIG. 2, which partially covers only the index finger 212-1 of the user's hand 212. In some embodiments, the first reader device automatically reads the data of the first tag without user input (e.g., without an explicit pushing of a trigger). For example, referring back to FIG. 1, in response to an antenna of the tag 104-1 being within a communication range threshold relative to an antenna of the wearable reader device 106, the antenna of the wearable reader device 106 receives a tag ID that identifies the tag 104-1 and the wearable reader device 106 automatically and responsively reads or decodes such tag ID.

In some embodiments, in response to the receiving of the first indication at block 1002, some embodiments access a data structure that indicates that the first asset is assigned to be placed in a first logistics vehicle (e.g., of a plurality of logistics vehicles). For example, as described with respect to FIG. 6, in some embodiments, the logistics vehicle asset assigning module 501 accesses (e.g., retrieves in computer memory) the data structure 600 of FIG. 6, which indicates that a the first asset is assigned to be loaded into logistics vehicle XJ5 based on the first asset's ID-A-being mapped to the respective logistics vehicle ID.

In some embodiments, in response to accessing such data structure, some embodiments transmit, to the first reader device or a third device (e.g., the mobile device 103 of FIG. 1) associated with the user, a notification that directs the user to the first logistics vehicle. In some embodiments, such notification is a simple location indicator (e.g., geo-coordinates and a map) that visually illustrates where the first logistics vehicle is. In some embodiments, such notification additionally or alternatively includes step-by-step instructions the user must take to arrive at the first logistics vehicle.

For example, "first walk 20 feet in the North direction, then turn left and start walking for about 10 feet, and the correct package car will be on your left."

Continuing with FIG. 10, per block 1004, some embodiments receive a second indication that at least one of: a second reader device has read the data of the first tag, or the first reader device has read data of a second tag. For example, in some embodiments, such "second reader device" includes the reader device(s) 112 or the reader device 118 of FIG. 1. Accordingly, for example, in some embodiments, block 1004 includes a server receiving, over a network and from the reader device 112, a tag ID of the tag 104-1, which indicates that the second reader device has read the data of the first tag. In another example, such "second tag" includes the reference tag(s) 110 or the reference tag(s) 122 of FIG. 1. Accordingly, for example, in some embodiments, block 1004 includes a server receiving, over a network and from the reader device 106, a tag ID of the reference tag(s) 110, which indicates that the first reader device 106 has read data of a second tag.

In some embodiments, the second reader device is located in a second logistics vehicle, of a plurality of logistics vehicles, or an environment that the user is in that is outside of any logistics vehicle, such as described above with respect to the reference tag(s) 110 and the reader device(s) 112 of FIG. 1.

As described herein, some embodiments transmit near real-time feedback indicating whether the user is heading towards the first logistics vehicle. In some embodiments, this includes the functionality as described with respect to the real-time loader feedback module 502. For example, subsequent to the receiving of the first indication, some embodiments detect, at a first time, a first signal strength or location associated with the first reader device reading data of a second tag coupled to an environment the user is in. For example, in response to the first reader device, such as the wearable reader device 106, transmitting a tag identifier received from the reference tag(s) 110, a server accesses the data structure 900 to map the tag identifier to the geographic ID it is located in (thus detecting the location where the first reader device 106 read the reference tag(s) 110 and thus inferring the position of the user).

Continuing with this example, subsequent to the detecting of the first signal strength or location, some embodiments detect, at a second time, a second signal strength or location associated with the first reader device reading data of a third tag (e.g., another one of the reference tag(s) 110) coupled to the environment that the user is in.

Based on the accessing of the data structure (e.g., the data structure 600) and the first and second signal strength or location, some embodiments transmit, to the first reader device or a third device associated with the user, near real-time feedback indicating whether the user is heading towards the first logistics vehicle. For example, referring back to FIG. 1, the second tag may be one of the reference tag(s) 110, which is located near the conveyor apparatus 102 and the third tag may be one of the reference tag(s) 110, which is located near (e.g., within a threshold distance of) the logistics vehicle 114. Accordingly, from this data, because it can be inferred that at the first time the user was near the conveyor apparatus 102 and at the second time the user was near the logistics vehicle 114, particular embodiments generate a score indicating a confidence level indicating that the user is likely heading towards the first logistics vehicle 114 or the correctly assigned logistics vehicle.

Per block 1006, based at least in part on the receiving of the first indication and/or the second indication, some embodiments determine whether the first asset is in the first logistics vehicle (regardless of whether the first logistics vehicle is a correctly assigned vehicle for the first asset). For example, referring back to FIG. 1, in response to receiving the second indication that the reader device 118 (which is inside the logistics vehicle 114) has read data from the tag 104-1 particular embodiments generate a score indicating a high confidence level (e.g., a 90% likelihood) that the first asset is inside the logistics vehicle 114. In some embodiments, block 1006 is alternatively or additionally based at least in part on the accessing of the data structure (e.g., the data structure 600 of FIG. 6). For example, not only can embodiments determine that an asset is inside a particular logistics vehicle but can also determine that an asset is in the correctly assigned vehicle based on the mapping of the tag ID to the logistics vehicle ID via the data structure 600.

In some embodiments, block 1006 represents the functionality of determining whether the user has transported the first asset to the first logistics vehicle. In other embodiments, however, this step is slightly different and represents an alternative functionality relative to block 1006. For example, in order to determine that the user has transported the first asset to the first logistics vehicle, in some embodiments, the wearable reader device 106 continually transmits its device ID and/or the tag ID of the tag 104-1 until it can be inferred that the tag ID of the tag 104-1 is read by a reader device inside a logistics vehicle. For example, referring back to FIG. 1, at a first time the wearable reader device 106 reads the tag ID of the tag 104-1 and transmits the tag ID and its own ID to a server. At a second subsequent time the wearable reader device 106 reads a second tag ID of the reference tag(s) 110 and responsively transmits the second tag ID and/or the tag ID of the tag 104-1 and its own ID to the server. At a third time subsequent to the second time, the wearable reader device 106 reads a third tag ID of the reference tag(s) 122 and then responsively transmits the third tag ID and its own ID to the server. Additionally or alternatively, the reader device 118 reads tag ID of the tag 104-1. Based on an access to each of the data structures 600, 700, 800, and 900, and each of these reader device and tag communications, particular embodiments generate a score indicative of a high confidence level that the user has indeed transported the first parcel to the first logistics vehicle since the user is wearing the reader device 106 and the tag 104-1 is attached to the asset (asset 104) that the user is carrying.

As described herein, some embodiments provide near real-time feedback indicating whether the user is heading towards the first logistics vehicle. In some embodiments, this is based on multiple reader devices reading the tag attached to an asset. For example, subsequent to the receiving of the second indication, some embodiments detect, at a first time a first signal strength or location associated with the second reader device (e.g., reader device 112) reading the data of the first tag. Subsequent to such detecting, some embodiments additionally detect, at a second tie, a signal strength or location associated with a third reader device (e.g., the reader device 118) reading the data of the first tag (e.g., a tag ID of the tag 104-1). Based on the accessing of the data structure (e.g., the data structure 600) and the first and second signal strength or location, some embodiments transmit, to the first reader device or third device associated with the user, near real-time feedback indicating whether the user is heading towards the first logistics vehicle, as described above.

Per block 1008, some embodiments, transmit, to the first reader device or other device (e.g., the mobile device 103 of FIG. 1), a notification (at least partially) indicating whether the first asset is in the first logistics vehicle. For example, if it detected that the first asset is inside the first logistics vehicle, particular embodiments transmit a notification to a user device, which causes display of indicia that reads, "you have placed the package in the correct vehicle" or "you have placed the package in vehicle XYZ, which is an incorrectly assigned vehicle." However, if it detected that the first asset is inside a different vehicle, particular embodiments transmit a notification to a user device, which causes display of indicia that reads, "the package has been placed in the incorrectly assigned vehicle." In some embodiments, the notification at block 1008 includes (or alternatively represents) an indication of whether the first asset has been transported to a correctly assigned vehicle. For example, the notification may read, "loader Y has transported package X to correctly assigned vehicle P."

Some embodiments additionally or alternatively determine tracking number duplicates. For example, some embodiments receive an indication that the first reader device (e.g., the wearable reader device 106) has read a first tracking number coupled to the first asset, as described with respect to FIG. 3. Some embodiments receive another indication that the first reader device (or some other reader device) has read a second tracking number coupled to a second asset. Some embodiments additionally determine, by comparing the first tracking number with the second tracking number, that the first tracking number and the second tracking number are duplicates, as described, for example, in FIG. 3. In response to such determination of the duplicates, some embodiments transmit, to the first reader device or third device associated with the user (e.g., the mobile device 103), a notification indicating that the first tracking number and the second tracking number are duplications. For example, such notification may represent notification 410 of FIG. 4. In some embodiments, such notification further includes an identifier of the first parcel and another parcel for whose tracking number has been detected to be part of a duplicate family. In this way, the assets can be pulled from delivery and/or associated contact information can be used to contact the shipper or other relevant entity.

IX. Apparatuses, Methods, and Systems

Embodiments of the present disclosure may be implemented in various ways, including as apparatuses that comprise articles of manufacture. An apparatus or system may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

X. Example Computing Environment

FIG. 11 is a schematic diagram of an example computing environment 1100 in which aspects of the present disclosure are employed in, according to some embodiments. As shown in FIG. 11, this particular computing environment 1100 includes one or more analysis computing entities 05 (e.g., a shipping company mainframe, cloud computing nodes, and/or logistics store desktop), a plurality of reader devices 25 (e.g., RFID readers), a plurality of reference tags (e.g., multiple RFID tags placed in a room), one or more target tags 72 (located on one or more assets 70), one or more source computing entities 10 (e.g., a mobile device, such as a DIAD or mobile phone), one or more logistics vehicles 11 (which include one or more additional reader devices and/or reference tags), and one or more wearable reader devices 06, each of which is communicatively coupled via one or more networks 510.

In some embodiments, "communicatively coupled" means that two or more components can perform data transportation between each other via a wired (e.g., Ethernet or fiber-optic medium connected in a LAN) or wireless (e.g., IEEE 802.15.4) computer protocol network. Each of these components, entities, devices, systems, and similar words used herein interchangeably may be in direct or indirect communication with one another over, for example, the same or different wired and/or wireless networks. Additionally, while FIG. 11 illustrates the various system entities as separate, standalone entities, the various embodiments are not limited to this particular architecture. In some embodiments, there are more or fewer (or combined) components than illustrated in the environment 1100.

In some embodiments, one or more components of the environment 1100 represent corresponding components as described herein. For example, in some embodiments, the source computing entity 10 represents the mobile device 103 of FIG. 1. In some embodiments, the analysis computing entity 05 represents the "server" as described herein. In some embodiments, the wearable reader device 06 represents the wearable reader device 106 of FIG. 1 or the wearable reader device assembly 206 of FIG. 2. In some embodiments, the logistics vehicle represents the logistics vehicle 114, 116, of FIG. 1 or 314 of FIG. 3. In some embodiments, the reader devices represents the reader devices 25 represent the reader device(s) 112 of FIG. 1. In some embodiments, the tags 23 represent the reference tag(s) 110 of FIG. 1.

In some embodiments, each of the components of the system 500 of FIG. 5 are located within the analysis computing entity 05. In some embodiments, the components of the system 500 of FIG. 5 are distributed among the components of the environment 1100. For example, in some embodiments, the real-time loader feedback module 502, the misload detector 504, the duplicate tracking number detector 506, and/or the notification module 508 are hosted on the wearable reader device 06.

In various embodiments, the network(s) 510 represents or includes an IoT (internet of things) or IoE (internet of everything) network, which is a network of interconnected items (e.g., asset 70, the wearable reader device 06, the logistics vehicle 06, the environment tags 23, and logistic server(s) 05) that are each provided with unique identifiers (e.g., UIDs) and computing logic so as to communicate or transfer data with each other or other components. Such communication can happen without requiring human-to-human or human-to-computer interaction. For example, an IoT network may include the mobile computing entity 10 that includes an application, which sends a request, via the network(s) 510, to the analysis computing entity 05 to determine or predict where the asset 70 is located. Responsively, the reader devices 25, the environment tags 23, and the asset tag(s) 72 may help generate sensor data so that the logistics server(s) 05 can analyze the data, as described in more detail below. In the context of an IoT network, a computing device can be or include one or more local processing devices (e.g., edge nodes) that are one or more computing devices configured to store and process, over the network(s) 510, either a subset or all of the received or respective sets of data to the one or more remote computing devices (e.g., the source computing entities 10 and/or the analysis computing entity 05) for analysis. An "asset" as described herein is any tangible item that is capable of being transported from one location to another. Assets may be or include the contents that enclose a product or other items people wish to ship. For example, an asset may be or include a parcel or group of parcels, a package or group of packages, a box, a crate, a drum, a container, a box strapped to a pallet, a bag of small items, and/or the like.

In some embodiments, the local processing device(s) described above is a mesh or other network of microdata centers or edge nodes that process and store local data received from the source computing entity 10 (e.g., a user device), the analysis computing entity 05, the reader devices 25, the tag 72, the tags 23, the logistics vehicle 11, and/or the wearable reader device 06 and push or transmit some or all of the data to a cloud device or a corporate data center that is or is included in the one or more analysis computing entities 05. In some embodiments, the local processing device(s) store all of the data and only transmit selected (e.g., data that meets a threshold) or important data to the one or more logistics servers 105. Accordingly, the non-important data or the data that is in a group that does not meet a threshold is not transmitted. In various embodiments where the threshold or condition is not met, daily or other time period reports are periodically generated and transmitted from the local processing device(s) to the remote device (s) indicating all the data readings gathered and processed at the local processing device(s). In some embodiments, the one or more local processing devices act as a buffer or gateway between the network(s) and a broader network, such as the one or more networks 510. Accordingly, in these embodiments, the one or more local processing devices can be associated with one or more gateway devices that translate proprietary communication protocols into other protocols, such as internet protocols.

The reader devices 25, the wearable reader device 06, and/or the reader devices within the logistics vehicle 11 are generally responsible for interrogating or reading data emitted from or located on the tags 23 and/or the tag 72. Each of the reader devices 25 may be any suitable reader machine, manufacture, or module. For example, the reader devices 25 can be Radio Frequency Identification (RFID) readers, Near-field Communication (NFC) readers, optical scanners, optical readers, bar code scanners, magnetic ink character recognition readers, beacon readers, or the like. The reader devices 25 can be coupled to or placed in any suitable location, such as a particular distance, orientation, and/or height from storage unit, on the ceiling of a building, on the floor of the building, one the walls of the building, and/or on any structure within a geographical area.

Each of the tags 23 and/or the tag 72 is generally responsible for indicating or emitting/transmitting data (e.g., to respective reader devices 25), such as an identifier that identifies the respective tag, which can be used to predict the location of the target tag(s) 72 (or more generally the asset 70), as described above. For example, indications that a subset of specific reader devices 25 are reading data from the target tag 72 can indicate that the target tag 72 is located in a particular geographical area (e.g., a particular room or section of a building) based on a predefined mapping data structure that associates each reader with a room. The tags 23 are placed in any suitable physical environment, geographical area, and/or apparatus (e.g., one or more storage units) within such physical environment or geographical area. A "geographical area" as described herein is any suitable location, such as one or more rooms or sections of a building, the inside of a building, the area within a logistics vehicle, the inside of a logistics store, an outdoor construction yard, the inside of a warehouse, a neighborhood, and/or any suitable area within a geofence or perimeter. The environment tags 23 can be coupled to or placed in any suitable location, such as attached to a front portion of a storage unit, on the ceiling of a building, on the floor of the building, on the walls of a building, and/or any structure, position, or orientation within a geographical area.

The tag(s) 72 are typically attached or otherwise coupled to target asset(s) 70, which need to be loaded in a particular logistics vehicle. Each of the target tag(s) 72 is generally responsible for indicating or emitting/transmitting data (e.g., to respective reader devices 25), such as an identifier that identifies the respective target tag, which can be used to predict the location of the target tag 72 (or more generally the asset 70), as describe above. Each of the tags 23, and/or the target tag(s) 72 may be or include any suitable tag, machine, manufacture, module, and/or computer-readable indicia. "Computer-readable indicia" as described herein is any tag (e.g., RFID or NFC tag) information, bar code, data matrix, numbers, lines, shapes, and/or other suitable identifier that is machine-readable (and tend not to be readable by a human) because machines can process the data. For example, the target tag(s) 72 and/or the environment tags 23 can be Radio Frequency Identification (RFID) tags (active or passive), Near-field Communication (NFC) tags, optical computer-readable indicia, bar code computer-readable indicia, magnetic ink character recognition computer-readable indicia, and/or beacons or the like.

XI. Example Analysis Computing Entity

FIG. 12 is a block diagram of the analysis computing entity 05 of FIG. 11, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 05 may also include one or more communications interfaces 24 for communicating with various computing entities, such as by communicating data, content, information/data, and/or similar terms used herein interchangeably that can be transmitted, received, operated on, processed, displayed, stored, and/or the like.

As shown in FIG. 12, in particular embodiments, the analysis computing entity 05 may include or be in communication with one or more processing elements 20 (also referred to as processors, processing circuitry, and/or similar terms used herein interchangeably) that communicate with other elements within the analysis computing entity 05 via a bus, for example. As will be understood, the processing element 20 may be embodied in a number of different ways. For example, the processing element 20 may be embodied as one or more complex programmable logic devices (CPLDs), microprocessors, multi-core processors, coprocessing entities, application-specific instruction-set processors (ASIPs), microcontrollers, and/or controllers. Further, the processing element 20 may be embodied as one or more other processing devices or circuitry. The term circuitry may refer to an entirely hardware embodiment or a combination of hardware and computer program products. Thus, the processing element 20 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 20 may be configured for a particular use or configured to execute instructions stored in volatile or non-volatile media or otherwise accessible to the processing element 20. As such, whether configured by hardware or computer program products, or by a combination thereof, the processing element 20 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 22, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media (also referred to as volatile storage, memory, memory storage, memory circuitry and/or similar terms used herein interchangeably). In particular embodiments, the volatile storage or memory may also include one or more volatile storage or memory media 26, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 20. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 20 and operating system.

As indicated, in particular embodiments, the analysis computing entity 05 may also include one or more communications interfaces 24 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

Xii. Example Source Computing Entity or Wearable Reader Device

Turning now to FIG. 13, a block diagram of a source computing entity 10 and/or the wearable reader device 06 of FIG. 11, according to some embodiments. In certain embodiments, source computing entity(s) 10 may be embodied as handheld computing entities, such as mobile phones, tablets, personal digital assistants, and/or the like, that may be operated at least in part based on user input received from a user via an input mechanism. Moreover, source computing entity(s) 10 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, source computing entity(s) 10 may be utilized as onboard controllers for UAVs configured for picking-up and/or delivering packages to various locations, and accordingly such source computing entity(s) 10 may be configured to monitor various inputs (e.g., from various sensors) and generated various outputs. It should be understood that various embodiments of the present disclosure may comprise a plurality of source computing entities 10 embodied in one or more forms (e.g., kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like-whether or not associated with a carrier. In particular embodiments, a user may operate a source computing entity 10 that may include one or more components that are functionally similar to those of the analysis computing entity 05. This figure provides an illustrative schematic representative of a source computing entity(s) 10 that can be used in conjunction with embodiments of the present disclosure. In general, the terms device, system, source computing entity, user device, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Source computing entity(s) 10 can be operated by various parties, including carrier personnel (sorters, loaders, delivery drivers, network administrators, and/or the like). As shown this figure, the source computing entity(s) 10 can include an antenna 30, a transmitter 32 (e.g., radio), a receiver 44 (e.g., radio), and a processing element 36 (e.g., CPLDs, microprocessors, multi-core processors, coprocessing entities, ASIPs, microcontrollers, and/or controllers) that provides signals to and receives signals from the transmitter 32 and receiver 34, respectively. In some embodiments, the source computing entity(s) 10 additionally includes other components not shown, such as a fingerprint reader, a printer, and/or the camera.

The signals provided to and received from the transmitter 32 and the receiver 34, respectively, may include signaling information in accordance with air interface standards of applicable wireless systems. In this regard, the source computing entity(s) 10 may be capable of operating with one or more air interface standards, communication protocols, modulation types, and access types. More particularly, the source computing entity(s) 10 may operate in accordance with any of a number of wireless communication standards and protocols, such as those described above with regard to the analysis computing entity(s) 05. In a particular embodiment, the source computing entity(s) 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the source computing entity(s) 10 may operate in accordance with multiple wired communication standards and protocols, such as those described above with regard to the analysis computing entity(s) 05 via a network interface 44.

Via these communication standards and protocols, the source computing entity(s) 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The source computing entity(s) 10 can also download changes, add-ons, and updates, for instance, to its firmware, software (e.g., including executable instructions, applications, program modules), and operating system.

According to particular embodiments, the source computing entity(s) 10 may include location determining aspects, devices, modules, functionalities, and/or similar words used herein interchangeably. For example, the source computing entity(s) 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the source computing entity(s) 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The source computing entity(s) 10 may also comprise a user interface (that can include a display 38 coupled to a processing element 36) and/or a user input interface (coupled to a processing element 36). For example, the user interface may be a user application, browser, user interface, and/or similar words used herein interchangeably executing on and/or accessible via the source computing entity 10 to interact with and/or cause display of information from the analysis computing entity 05, as described herein. The user input interface can comprise any of a number of devices or interfaces allowing the source computing entity(s) 10 to receive information/data, such as a keypad 40 (hard or soft), a touch display, voice/speech or motion interfaces, or other input device. In embodiments including a keypad 40, the keypad 40 can include (or cause display of) the conventional numeric (0-9) and related keys (#, *), and other keys used for operating the source computing entity(s) 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in this figure, the source computing entity(s) 10 may also include an camera 42, imaging device, and/or similar words used herein interchangeably (e.g., still-image camera, video camera, IoT enabled camera, IoT module with a low resolution camera, a wireless enabled MCU, and/or the like) configured to capture images. The source computing entity(s) 10 may be configured to capture images via the onboard camera 42, and to store those imaging devices/cameras locally, such as in the volatile memory 46 and/or non-volatile memory 48. As discussed herein, the source computing entity(s) 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 42. The contextual data may be stored as a portion of the image (such that a visual representation of the image data includes the contextual data) and/or may be stored as metadata associated with the image data that may be accessible to various computing entity(s) 10.

The source computing entity(s) 10 may include other input mechanisms, such as scanners (e.g., barcode scanners), microphones, accelerometers, RFID readers, and/or the like configured to capture and store various information types for the source computing entity(s) 10. For example, a scanner may be used to capture parcel/item/shipment information/data from an item indicator disposed on a surface of a shipment or other item. In certain embodiments, the source computing entity(s) 10 may be configured to associate any captured input information/data, for example, via the onboard processing element 36. For example, scan data captured via a scanner may be associated with image data captured via the camera 42 such that the scan data is provided as contextual data associated with the image data.

The source computing entity(s) 10 can also include volatile storage or memory 46 and/or non-volatile storage or memory 48, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the source computing entity(s) 10. As indicated, this may include a user application that is resident on the entity or accessible through a browser or other user interface for communicating with the analysis computing entity 05 and/or various other computing entities.

In another embodiment, the source computing entity(s) 10 may include one or more components or functionality that are the same or similar to those of the analysis computing entity 05, as described in greater detail above. As will be recognized, these architectures and descriptions are provided for exemplary purposes only and are not limiting to the various embodiments.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Some embodiments are directed to a system comprising: at least one computer processor; and one or more computer storage media storing computer-useable instructions that, when used by the at least one computer processor, cause the at least one computer processor to perform operations comprising: receiving a first indication that a first reader device has read data of a first tag coupled to a first asset, the first reader device being included in an article worn by a user; in response to the receiving of the first indication, accessing a data structure that indicates that the first asset is assigned to be placed in a first logistics vehicle, of a plurality of logistics vehicles; receiving a second indication that a second reader device has read the data of the first tag; and based at least in part on the accessing of the data structure and the receiving of the second indication, determining whether the first asset is inside of the first logistics vehicle.

In any combination of the above embodiments of the system, the operations further comprising: in response to the determining whether the first asset is inside of the first logistics vehicle, transmitting, to the first reader device or a third device associated with the user, a notification indicating whether the first asset has been placed in a correctly assigned logistics vehicle.

In any combination of the above embodiments of the system, the second reader device is located in one of: the first logistics vehicle, a second logistics vehicle, of the plurality of logistics vehicles, or an environment that the user is in that is outside of a logistics vehicle.

In any combination of the above embodiments of the system, the article is configured to be worn over at least a portion of the user's hand, and wherein the first reader device automatically reads the data of the first tag without user input.

In any combination of the above embodiments of the system, the operations further comprising: in response to the accessing of the data structure, transmitting, to the first reader device or a third device associated with the user, a notification that directs the user to the first logistics vehicle.

In any combination of the above embodiments of the system, the operations further comprising: subsequent to the receiving of the first indication, detecting, at a first time, a first signal strength or location associated with the first reader device reading data of a second tag coupled to an environment the user is in; subsequent to the detecting of the first signal strength or location, detecting, at a second time, a second signal strength or location associated with the first reader device reading data of a third tag coupled to the environment the user is in; and based on the accessing of the data structure and the first and second signal strength or location, transmitting, to the first reader device or a third device associated with the user, near real-time feedback indicating whether the user is heading towards the first logistics vehicle.

In any combination of the above embodiments of the system, the operations further comprising: subsequent to the receiving of the second indication, detecting, at a first time, a first signal strength or location associated with the second reader device reading the data of the first tag; subsequent to the detecting of the first signal strength or location, detecting, at a second time, a second signal strength or location associated with a third reader device reading the data of the first tag; and based on the accessing of the data structure and the first and second signal strength or location, transmitting, to the first reader device or a third device associated with the user, near real-time feedback indicating whether the user is heading towards the first logistics vehicle.

In any combination of the above embodiments of the system, the operations further comprising: receiving an indication that the first reader device has read a first tracking number coupled to the first asset; receiving another indication that the first reader device has read a second tracking number coupled to a second asset; determining, by comparing the first tracking number with the second tracking number, that the first tracking number and the second tracking number are duplicates; and in response to the determining that the first tracking number and the second tracking number are duplicates, transmitting, to the first reader device or third device associated with the user, a notification indicating that the first tracking number and the second tracking number are duplicates.

Some embodiments are directed to a computer-implemented method comprising: receiving a first indication that a first reader device has read data of a first tag coupled to a first asset, the first reader device being included in an article worn by a user; subsequent to the receiving of the first indication, receiving a second indication that at least one of: a second reader device has read the data of the first tag, or the first reader device has read data of a second tag, the second reader device and the second tag being located in a first logistics vehicle; based at least in part on the receiving of the first indication and the second indication, determining that the user has transported the first asset to the first logistics vehicle; and in response to the determining, transmitting, to the first reader device or a third device associated with the user, a notification indicating whether the first asset has been transported to a correctly assigned logistics vehicle.

In any combination of the above embodiments of the computer-implemented method, the article is configured to be worn over at least a portion of the user's hand, and wherein the first reader device automatically reads the data of the first tag without user input.

In any combination of the above embodiments of the computer-implemented method, the method further comprising: at least partially in response to the receiving of the first indication, transmitting, to the first reader device or a third device associated with the user, a notification that directs the user to the first logistics vehicle.

In any combination of the above embodiments of the computer-implemented method, the method further comprising: subsequent to the receiving of the first indication, detecting, at a first time, a first signal strength or location associated with the first reader device reading data of a second tag coupled to an environment the user is in; subsequent to the detecting of the first signal strength or location, detecting, at a second time, a second signal strength or location associated with the first reader device reading data of a third tag coupled to the environment the user is in; and based at least in part on the first and second signal strength or location, transmitting, to the first reader device or a third device associated with the user, near real-time feedback indicating whether the user is heading towards the first logistics vehicle.

In any combination of the above embodiments of the computer-implemented method, the method further comprising: prior to the receiving of the second indication, detecting, at a first time, a first signal strength or location associated with a third reader device reading the data the first tag; subsequent to the detecting of the first signal strength or location, detecting, at a second time, a second signal strength or location associated with a fourth reader device reading the data of the first tag; and based at least in part on the first and second signal strength or location, transmitting, to the first reader device or a third device associated with the user, near real-time feedback indicating whether the user is heading towards the first logistics vehicle.

In any combination of the above embodiments of the computer-implemented method, the method further comprising: receiving an indication that the first reader device has read a first tracking number coupled to the first asset; receiving another indication that the first reader device has read a second tracking number coupled to a second asset; determining, by comparing the first tracking number with the second tracking number, that the first tracking number and the second tracking number are duplicates; and in response to the determining that the first tracking number and the second tracking number are duplicates, transmitting, to the first reader device or third device associated with the user, a notification indicating that the first tracking number and the second tracking number are duplicates and an identifier of the first asset and the second asset.

In any combination of the above embodiments of the computer-implemented method, the method further comprising: in response to the receiving of the first indication, accessing a data structure that indicates that the first asset is assigned to be placed in the first logistics vehicle, of a plurality of logistics vehicles, wherein the notification indicating whether the first asset has been transported to a correctly assigned logistics vehicle is based on the assessing of the data structure, and wherein the first logistics vehicle is the correctly assigned logistics vehicle.

Some embodiments are directed to a system comprising: a first reader device coupled to a wearable article, the first reader device is configured to read data of one or more tags coupled to one or more assets, the wearable article is configured to be worn by a user; at least one of: a second reader device or a second tag coupled to an inside housing of a first logistic vehicle, the second reader device being at least partially configured to read the one or more tags; at least one computer processor; and one or more computer storage media storing computer-useable instructions that, when used by the at least one computer processor, cause the at least one computer processor to perform operations comprising: determining whether a first asset is inside a correctly assigned logistics vehicle based at least in part on the second reader device reading data of the one or more tags or the first reader device reading data of the second tag, and in response to the determining, transmitting, to the first reader device or a third device associated with the user, a notification indicating whether the first asset is inside the correctly assigned logistics vehicle.

In any combination of the above embodiments of the system, the article is configured to be worn over at least a portion of the user's hand, and wherein the first reader device is configured to automatically read data of a first tag coupled to the first asset without user input.

In any combination of the above embodiments of the system, the at least one computer processor is configured to perform further operations comprising: at least partially in response to receiving an indication that the first reader device has read a tag coupled to the first asset, transmitting, to the first reader device or a third device associated with the user, a notification that directs the user to the correctly assigned logistics vehicle.

In any combination of the above embodiments of the system, the at least one computer processor is configured to perform further operations comprising: subsequent to the receiving an indication that the first reader device has read a tag coupled to the first asset, detecting, at a first time, a first signal strength or location associated with the first reader device reading data of the second tag; subsequent to the detecting of the first signal strength or location, detecting, at a second time, a second signal strength or location associated with the first reader device reading data of a third tag coupled to the environment the user is in; and based at least in part on the first and second signal strength or location, transmitting, to the first reader device or a third device associated with the user, near real-time feedback indicating whether the user is heading towards the correctly assigned logistics vehicle.

In any combination of the above embodiments of the system, the at least one computer processor is configured to perform further operations comprising: detecting, at a first time, a first signal strength or location associated with a third reader device reading the data from a tag coupled to the first asset; subsequent to the detecting of the first signal strength or location, detecting, at a second time, a second signal strength or location associated with a fourth reader device reading the data of the tag; and based at least in part on the first and second signal strength or location, transmitting, to the first reader device or a third device associated with the user, near real-time feedback indicating whether the user is heading towards the correctly assigned logistics vehicle.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "coupled" to refers to two or more components being attached, fixed, or otherwise connected. Any suitable component can be used to couple components together, such as one or more: screws, bolts, nuts, hook fasteners, nails, adhesive, etc.

What is claimed is:

1. A system comprising:
a first reader device configured to read data of a tag coupled to an asset automatically without an individual person who is associated with the first reader device performing a mechanical action with respect to the first reader device by transmitting a first signal to interrogate the tag and send a first indication in response to reading the data;
an antenna located within an enclosed storage location and configured to read the data of the tag by transmitting a second signal to interrogate the tag;
a second reader device configured to receive the data from the antenna and send a second indication in response to receiving the data;
at least one computer processor; and
one or more computer storage media storing computer-useable instructions that, when used by the at least one computer processor, cause the at least one computer processor to perform operations comprising:
receiving the first indication from the first reader device;
in response to receiving the first indication, accessing a data structure that indicates that the asset is assigned to be placed within the enclosed storage location;
subsequent to determining that the asset is assigned to be placed within the enclosed storage location, providing a first notification that the individual person is traveling towards the enclosed storage location; and
subsequent to providing the first notification:
receiving the second indication from the second reader device;
determining, based at least in part on the second indication, that the asset has been placed within the enclosed storage location; and
in response to determining that the asset has been placed within the enclosed storage location, providing a second notification indicating that the asset is assigned to be placed within the enclosed storage location.

2. A method comprising:
reading, by a reader device, data of a tag coupled to an asset automatically without an individual person who is associated with the reader device performing a mechanical action with respect to the reader device by transmitting a first signal to interrogate the tag;

in response to reading the data, sending, by the reader device, a first indication;

reading, by the reader device, second data of a reference tag located within an enclosed storage location automatically without the individual person performing the mechanical action with respect to the reader device by transmitting a second signal to interrogate the reference tag;

in response to receiving the second data, sending, by the reader device, a second indication;

receiving, by a at least one computer processor, the first indication from the reader device;

determining, by the at least one computer processor and based at least in part on the first indication, that the asset is assigned to be placed within the enclosed storage location;

in response to determining that the asset is assigned to be placed within the enclosed storage location, transmitting, by the at least one computer processor and to the reader device, a first notification that the individual person is traveling towards the enclosed storage location; and subsequent to providing the first notification:
receiving, by the at least one computer processor, the second indication from the reader device;
determining, by the at least one computer processor and based at least in part on the second indication, that the asset has been placed within the enclosed storage location; and
in response to determining that the asset has been placed within the enclosed storage location, providing, by the at least one computer processor, a second notification indicating that the asset is assigned to be placed within the enclosed storage location.

3. A system comprising:
a reader device configured to:
read data of a tag coupled to an asset automatically without an individual person who is associated with the reader device performing a mechanical action with respect to the reader device by transmitting a first signal to interrogate the tag;
send a first indication in response to reading the data;
read second data of a reference tag located within an enclosed storage location automatically without the individual person performing the mechanical action with respect to the reader device by transmitting a second signal to interrogate the reference tag;
send a second indication in response to reading the second data;
at least one computer processor; and
one or more computer storage media storing computer-useable instructions that, when used by the at least one computer processor, cause the at least one computer processor to perform operations comprising:
receiving the first indication from the reader device;
determining, based at least in part on the first indication, that the asset is assigned to be placed within the enclosed storage location;
in response to determining that the asset is assigned to be placed within the enclosed storage location, transmitting a first notification that the individual person is traveling towards the enclosed storage location; and, subsequent to providing the first notification:
receiving the second indication from the reader device;
determining, based at least in part on the second indication, that the asset has been placed within the enclosed storage location; and
in response to determining that the asset has been placed within the enclosed storage location, providing a second notification indicating that the asset is assigned to be placed within the enclosed storage location.

4. The system of claim 1, wherein the first reader device is embedded in an article worn by the individual person.

5. The system of claim 1, wherein the first reader device reads the data of the tag based at least in part on the individual person moving the first reader device within at least one of a signal strength threshold, a communication capability threshold, or a distance threshold of the tag.

6. The system of claim 1, wherein providing the first notification that the individual person is traveling towards the enclosed storage location comprises:
receiving a third indication from a third reader device, wherein:
the third reader device is associated with an environment associated with the enclosed storage location, and
the third reader device has sent the third indication in response to reading the data of the tag;
receiving a fourth indication from a fourth reader device, wherein:
the fourth reader device is associated with the environment and is located closer to the enclosed storage location than the third reader device, and
the fourth reader device has sent the fourth indication in response to reading the data of the tag; and
determining, based at least in part on receiving the third indication and the fourth indication, that the individual person is traveling towards the enclosed storage location.

7. The system of claim 1, wherein providing the first notification that the individual person is traveling towards the enclosed storage location comprises:
receiving a third indication from the first reader device, wherein the first reader device has sent the third indication in response to reading second data of a reference tag associated with an environment associated with the enclosed storage location;
receiving a fourth indication from the first reader device, wherein the first reader device has sent the fourth indication in response to reading third data of a second reference tag associated with the environment that is closer to the enclosed storage location than the reference tag; and
determining, based at least in part on receiving the third indication and the fourth indication, that the individual person is traveling towards the enclosed storage location.

8. The system of claim 1, wherein the data comprises an identifier of the tag and determining that the asset is assigned to be placed within the enclosed storage location comprises querying the data structure using the identifier to identify the tag is associated with the asset, and the asset is to be placed within the enclosed storage location.

9. The system of claim 1, wherein the second indication comprises at least one of a quantity of reading the data from the tag or a strength of reading the data from the tag by the second reader device and determining, based at least in part on the second indication, that the asset has been placed within the enclosed storage location comprises determining at least one of the quantity or the strength is greater than a second quantity of reading the data from the tag or a second strength of reading the data from the tag by another reader device associated with a second enclosed storage location.

10. The method of claim 2, wherein the reader device is embedded in an article worn by the individual person.

11. The method of claim 2, wherein providing the first notification that the individual person is traveling towards the enclosed storage location comprises:
receiving a third indication from a second reader device, wherein:
the second reader device is associated with an environment associated with the enclosed storage location, and
the second reader device has sent the third indication in response to reading the data of the tag;
receiving a fourth indication from a third reader device, wherein:
the third reader device is associated with the environment and is located closer to the enclosed storage location than the second reader device, and
the third reader device has sent the third indication in response to reading the data of the tag; and
determining, based at least in part on receiving the third indication and the fourth indication, that the individual person is traveling towards the enclosed storage location.

12. The method of claim 2, wherein providing the first notification that the individual person is traveling towards the enclosed storage location comprises:
receiving a third indication from the reader device, wherein the reader device has sent the third indication in response to reading third data of a second reference tag associated with an environment associated with the enclosed storage location;
receiving a fourth indication from the reader device, wherein the reader device has sent the fourth indication in response to reading fourth data of a third reference tag associated with the environment that is closer to the enclosed storage location than the second reference tag; and
determining, based at least in part on receiving the third indication and the fourth indication, that the individual person is traveling towards the enclosed storage location.

13. The method of claim 2, wherein the second indication comprises at least one of a quantity of reading the second data from the reference tag or a strength of reading the second data from the reference tag by the reader device and determining, based at least in part on the second indication, that the asset has been placed within the enclosed storage location comprises determining at least one of the quantity or the strength is greater than a second quantity of reading third data from a second reference tag associated with a second enclosed storage location or a second strength of reading the third data from the second reference tag by the reader device.

14. The system of claim 3, wherein the reader device is embedded in an article worn by the individual person.

15. The system of claim 3, wherein the reader device reads the data of the tag based at least in part on the individual person moving the reader device within at least one of a signal strength threshold, a communication capability threshold, or a distance threshold of the tag.

16. The system of claim 3, wherein the reader device reads the second data of the reference tag based at least in part on the individual person moving the reader device within at least one of a second signal strength threshold, a second communication capability threshold, or a second distance threshold of the reference tag.

17. The system of claim 3, wherein providing the first notification that the individual person is traveling towards the enclosed storage location comprises:
receiving a third indication from a second reader device, wherein:
the second reader device is associated with an environment associated with the enclosed storage location, and
the second reader device has sent the third indication in response to reading the data of the tag;
receiving a fourth indication from a third reader device, wherein:
the third reader device is associated with the environment and is located closer to the enclosed storage location than the second reader device, and
the third reader device has sent the fourth indication in response to reading the data of the tag; and
determining, based at least in part on receiving the third indication and the fourth indication, that the individual person is traveling towards the enclosed storage location.

18. The system of claim 3, wherein providing the first notification that the individual person is traveling towards the enclosed storage location comprises:
receiving a third indication from the reader device, wherein the reader device has sent the third indication in response to reading third data of a second reference tag associated with an environment associated with the enclosed storage location;
receiving a fourth indication from the reader device, wherein the reader device has sent the fourth indication in response to reading fourth data of a third reference tag associated with the environment that is closer to the enclosed storage location than the second reference tag; and
determining, based at least in part on receiving the third indication and the fourth indication, that the individual person is traveling towards the enclosed storage location.

19. The system of claim 3, wherein the data comprises an identifier of the tag and determining that the asset is assigned to be placed within the enclosed storage location comprises querying at least one data structure using the identifier to identify the tag is associated with the asset, and the asset is to be placed within the enclosed storage location.

20. The system of claim 3, wherein the second indication comprises at least one of a quantity of reading the second data from the reference tag or a strength of reading the second data from the reference tag by the reader device and determining, based at least in part on the second indication, that the asset has been placed within the enclosed storage location comprises determining at least one of the quantity or the strength is greater than a second quantity of reading third data from a second reference tag associated with a second enclosed storage location or a second strength of reading the third data from the second reference tag by the reader device.

* * * * *